US012715537B2

(12) United States Patent
Demers et al.

(10) Patent No.: US 12,715,537 B2
(45) Date of Patent: Aug. 25, 2026

(54) ELECTRIC VEHICLE WITH AN ELECTRIC MOTOR MOUNTED TO A SWING ARM

(71) Applicant: BOMBARDIER RECREATIONAL PRODUCTS INC., Valcourt (CA)

(72) Inventors: Jerome Demers, Sunnyvale, CA (US); Bruno Cyr, Shefford (CA); Christopher Gauthier, Sherbrooke (CA); Jonathan Fortier, Lawrenceville (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 18/705,838

(22) PCT Filed: Apr. 26, 2023

(86) PCT No.: PCT/IB2023/054324
§ 371 (c)(1),
(2) Date: Apr. 29, 2024

(87) PCT Pub. No.: WO2024/115971
PCT Pub. Date: Jun. 6, 2024

(65) Prior Publication Data

US 2026/0138700 A1 May 21, 2026

Related U.S. Application Data

(63) Continuation-in-part of application No. PCT/IB2022/060500, filed on Oct. 31, 2022.

(Continued)

(51) Int. Cl.
*B62K 11/04* (2006.01)
*B62J 41/00* (2020.01)
*B62K 25/28* (2006.01)

(52) U.S. Cl.
CPC ............... *B62K 11/04* (2013.01); *B62J 41/00* (2020.02); *B62K 25/283* (2013.01); *B62K 2204/00* (2013.01)

(58) Field of Classification Search
CPC ................................ B62K 11/04; B62J 41/00
See application file for complete search history.

(56) References Cited

U.S. PATENT DOCUMENTS 6,341,660 B1 1/2002 Schiller
8,640,810 B2 2/2014 Tsukamoto et al.

(Continued)

FOREIGN PATENT DOCUMENTS

CN 112977694 A 6/2021
WO 2019/186749 A1 12/2020

(Continued)

*Primary Examiner* — Kevin Hurley
(74) *Attorney, Agent, or Firm* — BCF LLP

(57) ABSTRACT

An electric vehicle has: a frame having a pair of frame members; a front ground-engaging member operatively connected to the frame; a swing arm pivotally connected to the pair of frame members; a rear ground-engaging member operatively connected to the swing arm; an electric motor mounted to the swing arm and operatively connected to the rear ground-engaging member; a motor cooling channel in thermal communication with the electric motor; a battery pack connected to the frame; a battery cooling channel in thermal communication with the battery pack; at least one hose fluidly connected between the battery and motor cooling channels, the at least one hose extending in a space defined laterally between the frame members and longitudinally between the battery pack and the motor; and at least one power cable electrically connected between the battery pack and the motor, the at least one power cable extending in the space.

20 Claims, 27 Drawing Sheets

Related U.S. Application Data

(60) Provisional application No. 63/429,662, filed on Dec. 2, 2022, provisional application No. 63/273,435, filed on Oct. 29, 2021, provisional application No. 63/273,468, filed on Oct. 29, 2021.

(56) References Cited

U.S. PATENT DOCUMENTS

| | | | | |
|---|---|---|---|---|
| 8,672,077 | B2 | 3/2014 | Sand et al. | |
| 8,783,401 | B2 | 7/2014 | Nishiura et al. | |
| 8,897,959 | B1 | 11/2014 | Sweney et al. | |
| 9,193,411 | B2 | 11/2015 | Sand et al. | |
| 9,403,574 | B2 | 8/2016 | Sand et al. | |
| 9,415,673 | B2 | 8/2016 | Blain et al. | |
| 9,446,659 | B1 | 9/2016 | Blain et al. | |
| 9,802,556 | B2 | 10/2017 | Tanaka et al. | |
| 9,941,556 | B2 | 4/2018 | Testoni | |
| 10,008,704 | B2 | 6/2018 | Sweney et al. | |
| 10,270,314 | B2 * | 4/2019 | Matsuda | H02K 7/116 |
| 10,559,797 | B2 | 2/2020 | Sweney et al. | |
| 10,787,219 | B2 | 9/2020 | Oba | |
| 10,800,478 | B2 | 10/2020 | Shimizu et al. | |
| 11,142,285 | B2 * | 10/2021 | Futamata | B62K 25/04 |
| 2013/0270038 | A1 | 10/2013 | Nitta | |
| 2013/0270938 | A1 | 10/2013 | Matsuda | |
| 2014/0234668 | A1 | 8/2014 | Sweney et al. | |
| 2014/0234683 | A1 | 8/2014 | Sweney | |
| 2014/0234686 | A1 | 8/2014 | Sweney et al. | |
| 2015/0008061 | A1 | 1/2015 | Matsuda | |
| 2015/0314830 | A1 | 11/2015 | Inoue | |
| 2015/0344093 | A1 | 12/2015 | Inoue | |
| 2017/0129570 | A1 | 5/2017 | Mangum et al. | |
| 2020/0031420 | A1 | 1/2020 | Aunkst et al. | |
| 2020/0130498 | A1 | 4/2020 | Matsushima et al. | |

FOREIGN PATENT DOCUMENTS

| | | | | |
|---|---|---|---|---|
| WO | 2020/067269 | A1 | 8/2021 | |
| WO | 2020/194951 | A1 | 11/2021 | |
| WO | WO-2024115971 | A1 * | 6/2024 | H02K 5/225 |

* cited by examiner 132
134
137
258
15
160
165
169
167
118
110
133
269
116
16
200
250
270, 272
280
260
285
114
112

ELECTRIC VEHICLE WITH AN ELECTRIC MOTOR MOUNTED TO A SWING ARM

CROSS-REFERENCE

The present application claims priority to U.S. Provisional Patent Application No. 63/429,662, filed Dec. 2, 2022. For purposes of the United States of America, the present application in a Continuation-In-Part of International Patent Application No. PCT/IB2022/060500, filed Oct. 31, 2022, which claims priority to U.S. Provisional Patent Application No. 63/273,435, filed Oct. 29, 2021, and to U.S. Provisional Patent Application No. 63/273,468, filed Oct. 29, 2021.

FIELD OF TECHNOLOGY

The present technology relates to electric vehicles having an electric motor mounted to a swing arm.

BACKGROUND

Straddle seat vehicles, including motorcycles, all-terrain vehicles, and snowmobiles, are popular transport and recreational vehicles. As the move toward electrification of vehicles progresses, interest in electric versions of straddle seat vehicles increases. Electric vehicles generally include components that are required to be maintained within a specified temperature range, for instance battery packs, inverters, and motors. In some vehicles, cooling is provided through air-flow based cooling arrangements.

To better address cooling of each component, some solutions include circulating a liquid coolant around a circuit in thermal communication with the heat-generating components and one or more heat exchangers. In order to circulate the liquid coolant through these heat generating components, as well as to and from the heat exchanger(s), hoses are often employed.

Applied to straddle seat electric vehicles, however, hoses manifest several disadvantages. For example, hoses generally have a minimum radius of curvature which limits how much the hose can be bent. In the compact powerpack arrangements necessary for straddle seat vehicles, curvature limitations can severely restrict the possible layout design of the different powerpack components. Inclusion of hoses extending between different components further occupies the limited space. It is further noted that each hose and hose connection adds complication in terms of fabrication and maintenance. Each hose and hose connection could be a point of failure (in the form of material failure like cracking or leaks) and requires installation for each liquid connection via clamp, collar or other mechanical means.

There is therefore a desire for cooling arrangements for electric straddle seat vehicles addressing at least some of the above described disadvantages.

SUMMARY

It is an object of the present technology to ameliorate at least some of the inconveniences present in the prior art.

According to one aspect of the present technology, there is provided an electric vehicle having: a frame, the frame having a pair of frame members; a front ground-engaging member operatively connected to the frame; a swing arm pivotally connected to the pair of frame members about a swing arm pivot axis, the swing arm pivot axis extending through the pair of frame members; a rear ground-engaging member operatively connected to the swing arm; an electric motor mounted to the swing arm and operatively connected to the rear ground-engaging member; a motor cooling channel in thermal communication with the electric motor for cooling the electric motor; a battery pack connected to the frame; a battery cooling channel in thermal communication with the battery pack for cooling the battery pack, at least one hose fluidly connected between the battery cooling channel and the motor cooling channel, the at least one hose extending in a space defined laterally between the frame members and longitudinally between the battery pack and the motor; and at least one power cable electrically connected between the battery pack and the motor, the at least one power cable extending in the space.

In some embodiments, the swing arm pivot axis extends through the space defined laterally between the frame members and longitudinally between the battery pack and the motor.

In some embodiments, the at least one hose includes a first hose. With the vehicle at rest: a front end of the first hose is forward of the swing arm pivot axis; the front end of the first hose is vertically higher than the swing arm pivot axis; a rear end of the first hose is rearward of the swing arm pivot axis; and the rear end of the first hose is at least in part vertically lower than the swing arm pivot axis.

In some embodiments, the at least one hose includes a second hose. With the vehicle at rest: a front end of the second hose is forward of the swing arm pivot axis; the front end of the second hose is at least in part vertically lower than the swing arm pivot axis; a rear end of the second hose is rearward of the swing arm pivot axis; and the rear end of the second hose is vertically higher than the swing arm pivot axis.

In some embodiments, the electric motor has an output shaft. The output shaft defines an output shaft axis. The at least one hose includes a first hose. With the vehicle at rest: a front end of the first hose is forward of the swing arm pivot axis; the front end of the first hose is vertically higher than the output shaft axis; a rear end of the first hose is rearward of the swing arm pivot axis; and the rear end of the first hose is vertically lower than the output shaft axis.

In some embodiments, the at least one hose includes a second hose. With the vehicle at rest: a front end of the second hose is forward of the swing arm pivot axis; the front end of the second hose is vertically lower than the output shaft axis; a rear end of the second hose is rearward of the swing arm pivot axis; and the rear end of the second hose is vertically higher than the output shaft axis.

In some embodiments, with the vehicle at rest, the swing arm pivot axis extends through the first and second hoses.

In some embodiments, coolant flows from the motor cooling channel to the battery cooling channel via the first hose; and coolant flows from the battery cooling channel to the motor cooling channel via the second hose.

In some embodiments, the vehicle also has a pump. The pump is fluidly connected between the first hose and the battery cooling channel.

In some embodiments, the vehicle also has a radiator. The radiator is fluidly connected between the first hose and the pump.

In some embodiments, with the vehicle at rest: a front end of the at least one power cable is forward of the swing arm pivot axis; the front end of the at least one power cable is vertically higher than the swing arm pivot axis; a rear end of the at least one power cable is rearward of the swing arm pivot axis; and at least a portion of the at least one power cable being rearward and at least in part vertically lower than the swing arm pivot axis.

In some embodiments, the electric motor has an output shaft. The output shaft defines an output shaft axis. With the vehicle at rest: a front end of the at least one power cable is forward of the swing arm pivot axis; the front end of the at least one power cable is vertically higher than the output shaft axis; a rear end of the at least one power cable is rearward of the swing arm pivot axis; and the rear end of the at least one power cable is vertically lower than the output shaft axis.

In some embodiments, a portion of the at least one power cable is longitudinally aligned with the swing arm pivot axis is vertically higher than the swing arm pivot axis.

In some embodiments, an inverter is electrically connected to the battery pack. The at least one power cable is electrically connected between the inverter and the electric motor.

In some embodiments, the inverter is mounted to the battery pack.

In some embodiments, the at least one power cable is three power cables.

In some embodiments, a control cable is electrically connected between the inverter and the electric motor. The control cable extends in the space.

In some embodiments, with the vehicle at rest: a front end of the control cable is forward of the swing arm pivot axis; the front end of the control cable is vertically higher than the swing arm pivot axis; a rear end of the control cable is rearward of the swing arm pivot axis; and at least a portion of the control cable being rearward and at least in part vertically lower than the swing arm pivot axis.

In some embodiments, the electric motor has an output shaft. the output shaft defines an output shaft axis. With the vehicle at rest: a front end of the control cable is forward of the swing arm pivot axis; the front end of the control cable is vertically higher than the output shaft axis; a rear end of the control cable is rearward of the swing arm pivot axis; and the rear end of the control cable is vertically lower than the output shaft axis.

In some embodiments, a cover is connected to a bottom of the swing arm. Portions of the at least one hose, the at least one power cable, and the control cable are disposed between the cover and the electric motor.

In some embodiments, a cover is connected to a bottom of the swing arm. Portions of the at least one hose and the at least one power cable are disposed between the cover and the electric motor.

In some embodiments, the battery pack includes: a battery housing defining the battery cooling channel; and a plurality of battery cells housed in the battery housing.

In some embodiments, the battery pack is completely forward of the swing arm pivot axis.

In some embodiments, a shock absorber is operatively connected between the frame and the swing arm. The shock absorber is pivotally connected to the swing arm about a shock absorber pivot axis. The shock absorber pivot axis is rearward of rear ends of the at least one hose and the at least one power cable.

According to another aspect of the present technology, there is provided an electric vehicle having: a frame, the frame having a pair of frame members; a front ground-engaging member operatively connected to the frame; a swing arm pivotally connected to the pair of frame members about a swing arm pivot axis, the swing arm pivot axis extending through the pair of frame members; a rear ground-engaging member operatively connected to the swing arm; an electric motor mounted to the swing arm and operatively connected to the rear ground-engaging member; a motor cooling channel in thermal communication with the electric motor for cooling the electric motor; a battery pack connected to the frame; a battery cooling channel in thermal communication with the battery pack for cooling the battery pack; and at least one hose fluidly connected between the battery cooling channel and the motor cooling channel, the at least one hose extending in a space defined laterally between the frame members and longitudinally between the battery pack and the motor.

In some embodiments, the swing arm pivot axis extends through the space defined laterally between the frame members and longitudinally between the battery pack and the motor.

In some embodiments, with the vehicle at rest: a front end of the at least one hose is forward of the swing arm pivot axis; the front end of the at least one hose is vertically higher than the swing arm pivot axis; a rear end of the at least one hose is rearward of the swing arm pivot axis; and the rear end of the at least one hose is at least in part vertically lower than the swing arm pivot axis.

In some embodiments, part of the at least one hose is disposed at a radial distance from the swing arm pivot axis that is less than twice a diameter of the at least one hose.

In some embodiments, the radial distance is less than 1.5 times the diameter of the at least one hose In some embodiments, the radial distance is less than the diameter of the at least one hose.

In some embodiments, the at least one hose includes a first hose and a second hose. Coolant flows from the battery cooling channel to the motor cooling channel via one of the first and second hoses; and coolant flows from the motor cooling channel to the battery cooling channel via another one of the first and second hoses.

In some embodiments, the vehicle also has a pump. The pump is fluidly connected between the first hose and the battery cooling channel.

In some embodiments, the battery pack includes: a battery housing defining the battery cooling channel; and a plurality of battery cells housed in the battery housing.

In some embodiments, the battery pack is completely forward of the swing arm pivot axis.

For the purposes of the present application, terms related to spatial orientation such as forward, rearward, front, rear, upper, lower, left, and right, are as they would normally be understood by a driver of the vehicle sitting therein in a normal driving position with the vehicle being upright and steered in a straight ahead direction.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
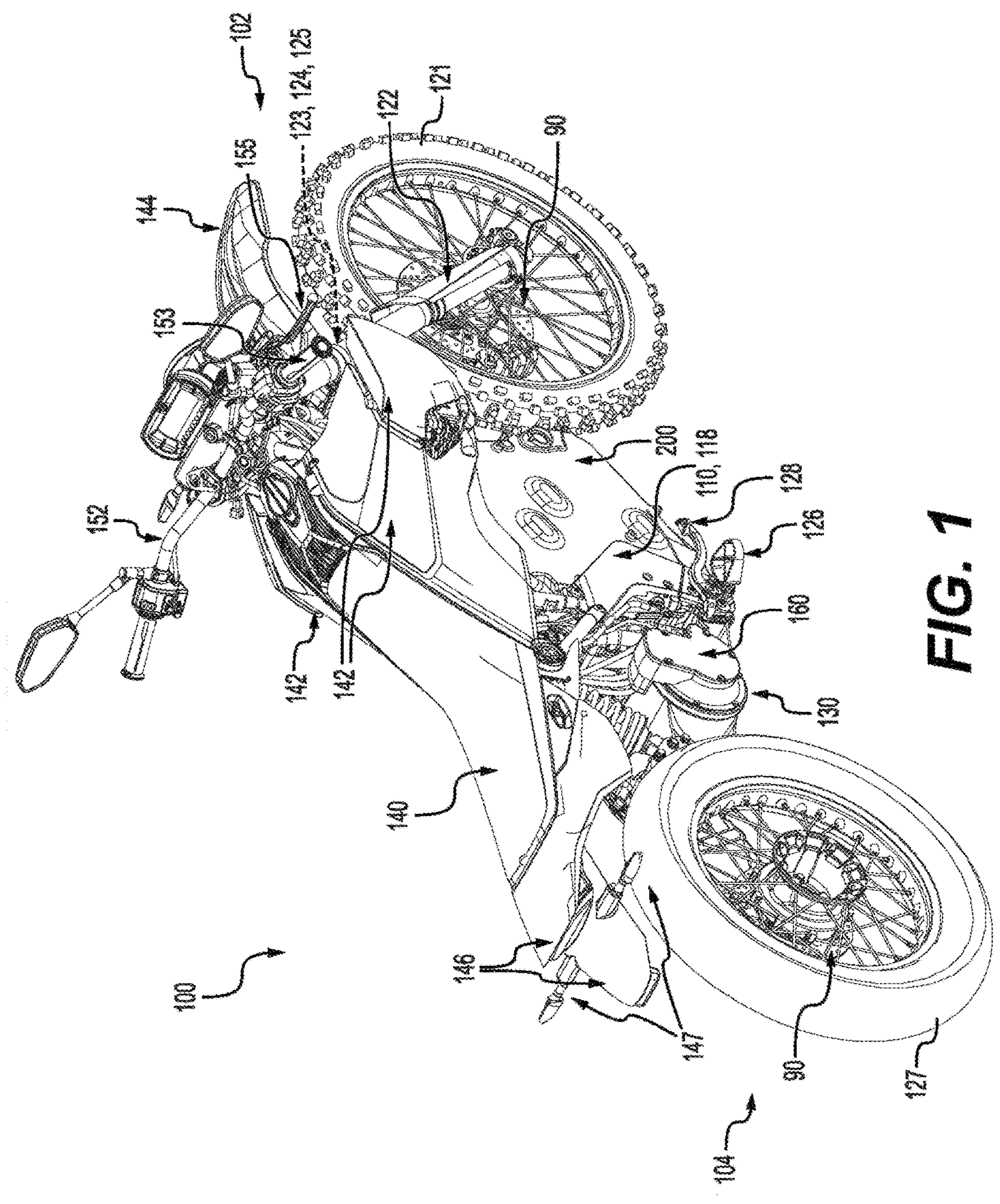
FIG. 1 is a top, rear, right side perspective view of an electric motorcycle according to a non-limiting embodiment of the present technology.

It should be noted that, unless otherwise explicitly specified herein, the drawings are not necessarily to scale.

DETAILED DESCRIPTION

The present technology will be described herein with respect to a straddle-seat electric vehicle, specifically a two-wheeled electric motorcycle 100. Aspects of the present technology could also be implemented in different straddle-seat electric vehicles having a swing arm, such as three-wheeled electric vehicles.

While the motorcycle 100 illustrated herein is a trail style electric motorcycle 100, it is contemplated that motorcycles according to the present technology could vary by a plurality of vehicle characteristics. These vehicle characteristics could include, but are not limited to, a rider posture configuration (also referred to as a rider position), a motorcycle type, tire type, a wheelbase, a steering arrangement, a weight distribution, a squat ratio, a rake angle, a seat height, and a mechanical trail. The rider posture configuration, or rider position, is the relative spacing and position of a rider's hands (when holding the handlebars), the rider's feet (when positioned on the footrests) and the rider's buttocks (when the rider is seated on a seat of the motorcycle). The steering arrangement could also vary and can be described by a variety of parameters, including but not limited to: a length of front suspension travel, a length of rear suspension travel, a front suspension stiffness, a rear suspension stiffness, a front and/or rear wheel size, rake angle, mechanical trail, triple clamp offset, squat ratio, and wheel base.

With reference to FIGS. 1 to 5, the electric motorcycle 100, referred to herein as the vehicle 100, has a front end 102, a rear end 104, and a longitudinal centerplane 103 defined consistently with the forward travel direction of the vehicle 100.

Figure 6:
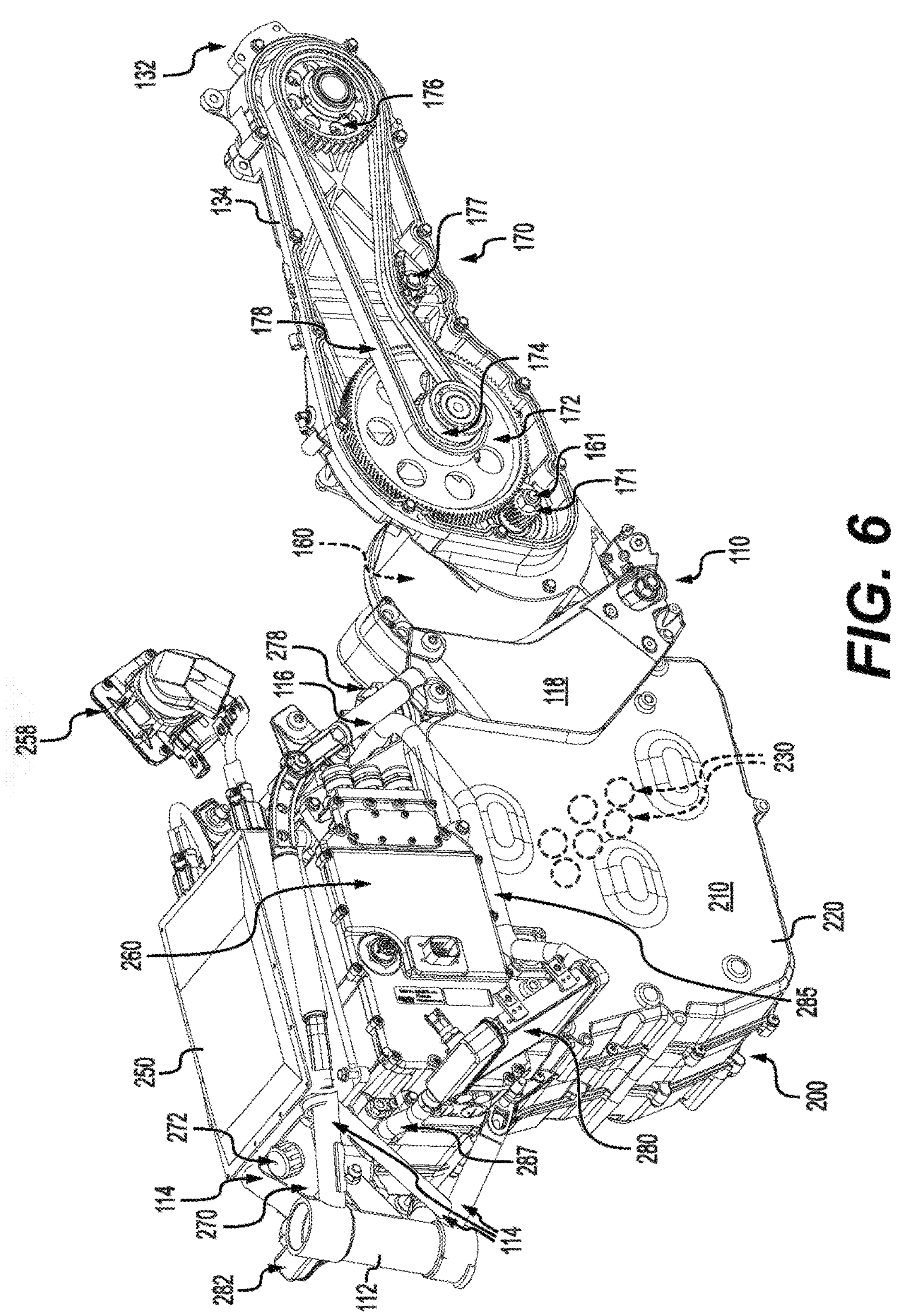
FIG. 6 is a top, front, left side perspective view of a frame, a powerpack, a drivetrain, and a swing arm of the vehicle of claim 1, with a housing cover of the swing arm having been removed.
Figure 7:
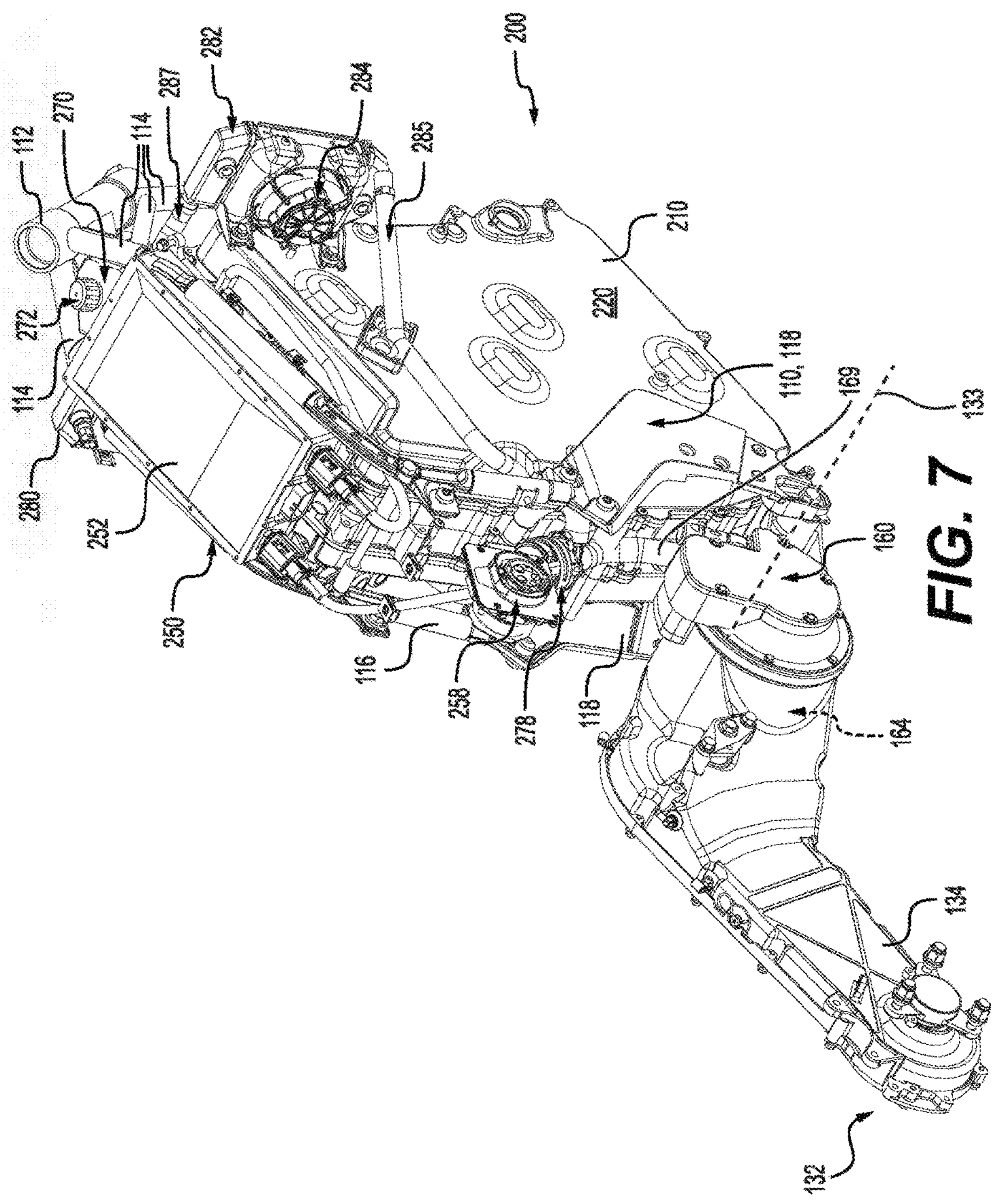
FIG. 7 is a top, rear, right side perspective view of the components of FIG. 6.
Figure 8:
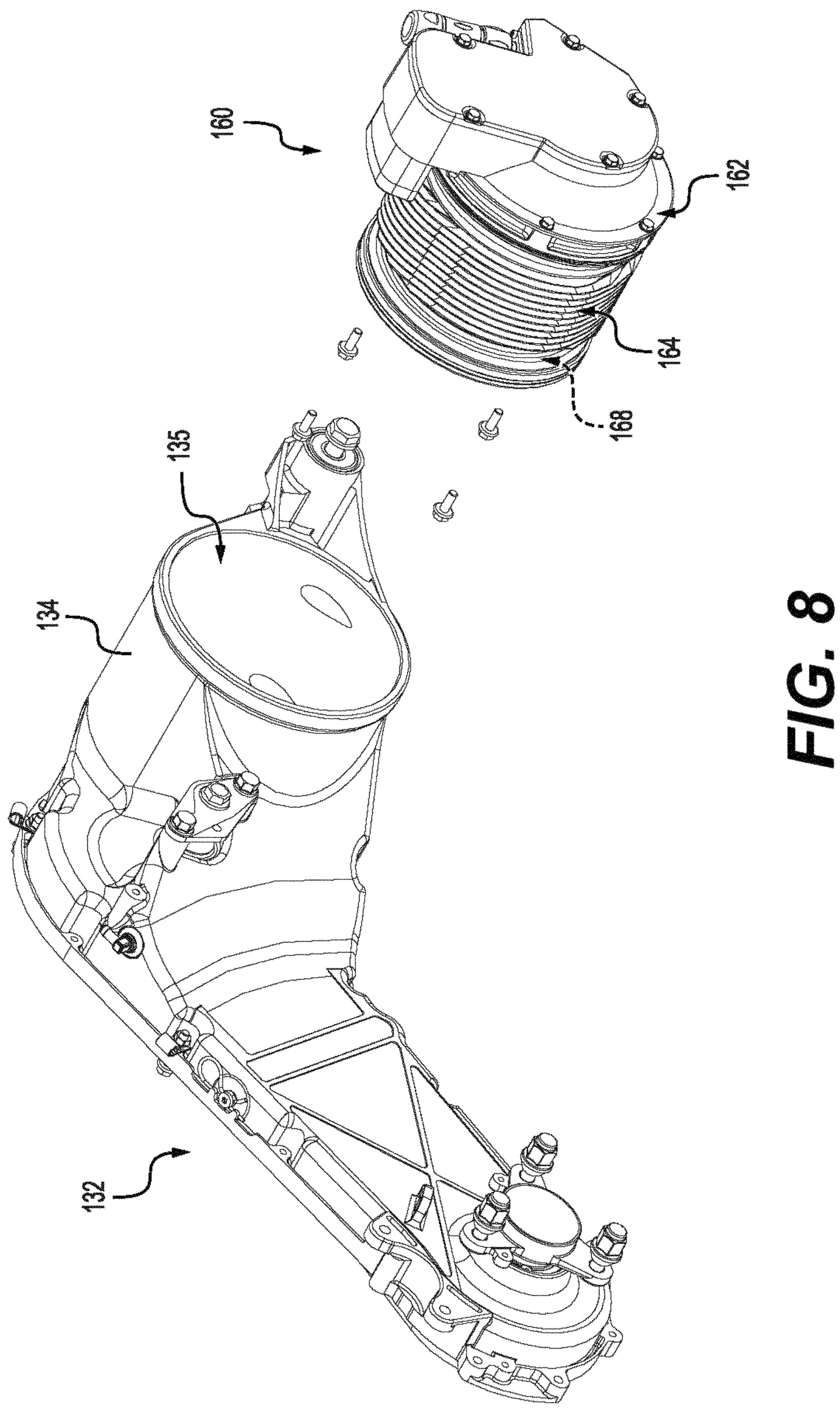
FIG. 8 is a top, rear, right side, exploded, perspective view of a motor and the swing arm of the vehicle of FIG. 1.

The vehicle 100 has a frame 110, shown in additional detail in FIGS. 6 to 8. The frame 110 includes a front suspension receiving portion 112, specifically a tube 112, sometimes referred to as a "head tube", for receiving therethrough a front fork assembly 124 (described in more detail below). Extending rearward from the tube 112, the frame 110 includes forward frame members 114. In the illustrated embodiment, there are six forward frame members 114 (three on each side of the centerplane 103) but it is contemplated that the specific number and arrangement of forward frame members 114 could vary.

The frame 110 also includes two upper intermediate frame members 116 extending rearward from the forward members 114. The frame members 116 are generally hockey-stick shaped, with rear portions of the members 116 curving rearward and downward from generally horizontal forward portions of the members 116. In different embodiments, the frame members 116 could be differently shaped.

The frame 110 further includes two lower intermediate frame members 118 connected to rear ends of the frame members 116. The frame members 118 extend generally vertically along left and right sides of the vehicle 100. The frame members 118 are generally in the shape of flattened boomerangs, but the particular shape could vary. It is contemplated that the frame members 118 could be left and right sides of a common frame bracket.

The frame 110 further includes a rear frame structure 120 (FIGS. 4 and 5) connected to and extending rearward and slightly upward from the upper intermediate frame members 116 and the lower intermediate frame members 118 (omitted from FIGS. 6 to 8). The rear frame structure 120 is also referred to as a seat support structure 120. It is contemplated that the frame 110 could include additional frame members, including but not limited to additional intermediate frame members and additional rear frame members.

The vehicle 100 is a two-wheeled vehicle 100 including a front wheel 121 and a rear wheel 127. The front wheel 121 and the rear wheel 127 each have a tire secured thereto. The front wheel 121 and the rear wheel 127 are centered with respect to the longitudinal centerplane 103.

The front wheel 121 is connected to the frame 110 by a front suspension assembly 123. The front suspension assembly 123 includes a front fork assembly 124 for supporting the front end 102 of the vehicle 100. The front fork assembly 124 includes a triple clamp assembly 125 connected to the tube 112 of the frame 110. The front fork assembly 124 includes a pair of front shocks 122 connected to the triple clamp assembly 125. The front wheel 121 of the front fork assembly 124 is connected to a bottom portion of the pair of front shocks 122.

The rear wheel 127 mounted to the frame 110 by a rear suspension assembly 130. The rear suspension assembly 130 includes a swing arm 132 and a shock absorber 136. The swing arm 132 is pivotally mounted at a front thereof to the frame 110. More specifically, the front of the swing arm 132 is received between lower portions of the lower intermediate frame members 118. The swing arm 132 pivots relative to the lower intermediate frame members 118 about a swing arm pivot axis 133 that extends through the lower intermediate frame members 118. As best seen in FIG. 6, the swing arm 132 includes a swing arm housing 134, in which is disposed an electric motor 160 and a drivetrain 170. The swing arm 132 includes a housing cover 137 selectively removable from the housing 134. The swing arm housing 134 and the housing cover 137 enclose the drivetrain 170. When the housing cover 137 is in place, the drivetrain 170 is bathed in lubricant within the swing arm 132.

The rear wheel 127 is rotatably mounted to the rear end of the swing arm 132 which extends on a left side of the rear wheel 127. The shock absorber 136 is connected between the swing arm 132 and the frame 110, specifically to the intermediate frame members 116. It is contemplated that the relative arrangement of the shock absorber 136 and the frame 110 could vary in different embodiments. The electric motor 160 and the drivetrain 170 will be described in more detail below.

The vehicle 100 has a straddle seat 140 mounted to the frame 110, specifically to the rear frame structure 120, and disposed along the longitudinal centerplane 103. In the illustrated embodiment, the straddle seat 140 is intended to accommodate a single adult-sized rider, i.e. the driver. It is however contemplated that the seat 140 could be longer or that a passenger seat portion could be connected to the rear frame structure 120 in order to accommodate a passenger behind the driver. Depending on the particular embodiment, it is also contemplated that the seat 140 could be supported by an assembly of frame members or tubes, a molded portion integrally connected to the seat 140, or body panels of the motorcycle 100.

Figure 2:
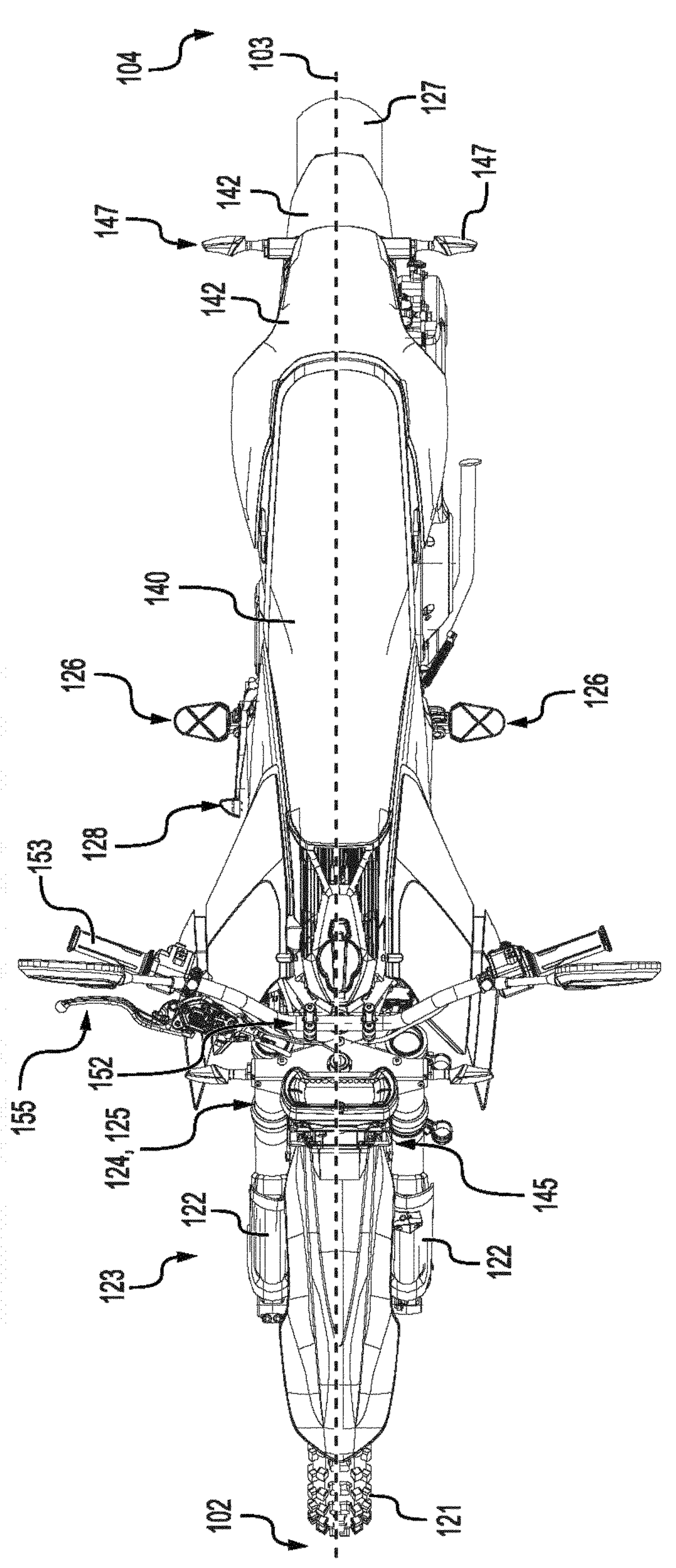
FIG. 2 is a top plan view of the vehicle of FIG. 1.
Figure 3:
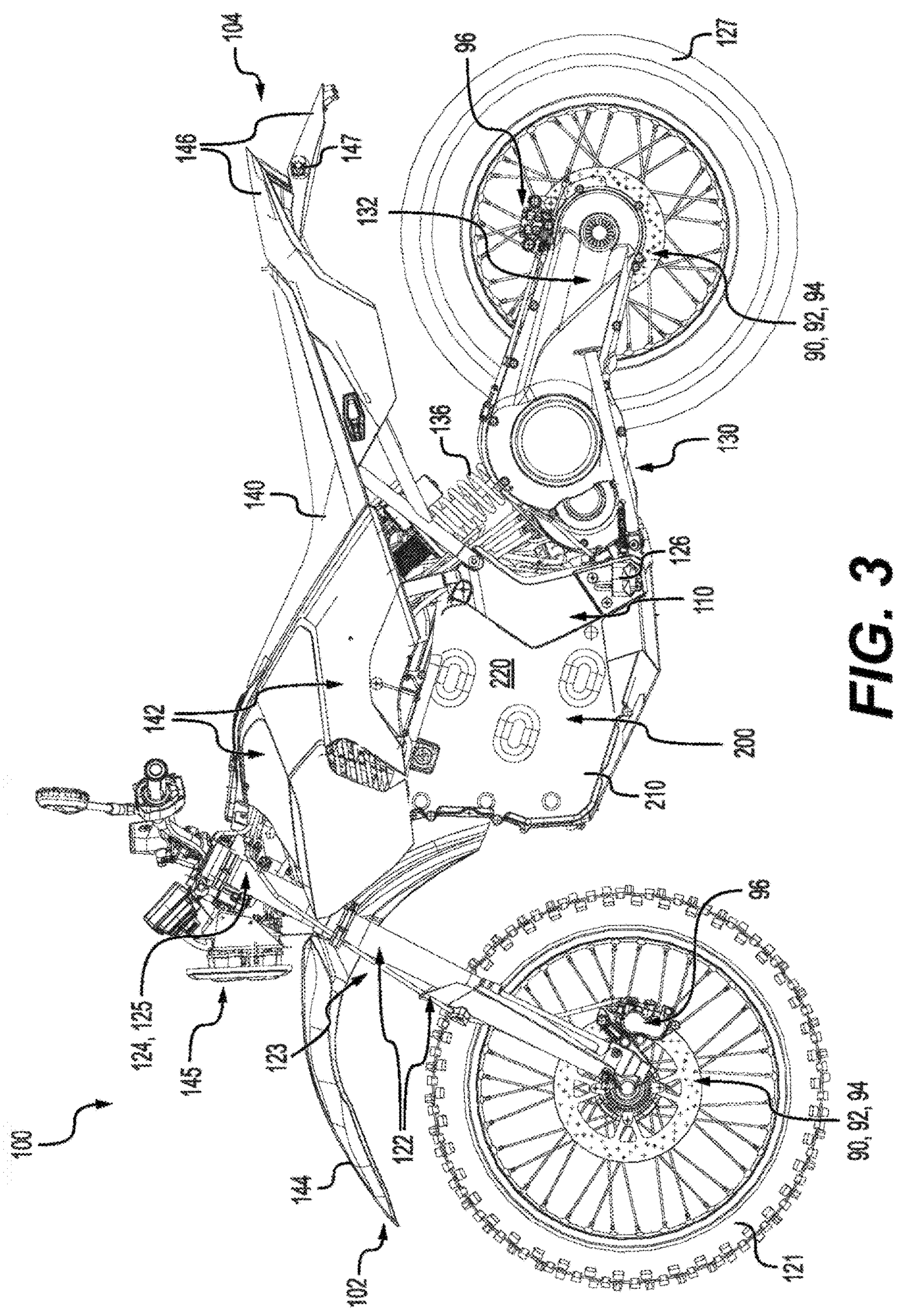
FIG. 3 is left side elevation view of the vehicle of FIG. 1.

The vehicle 100 further includes a plurality of body panels 142 for forming the body of the vehicle 100, illustrated in FIGS. 1 to 3. The body panels 142 are connected to and supported by the frame members 114, 116. The body panels 142 enclose and protect some internal components of the vehicle 100 such as a powerpack 200 (described further below). The vehicle 100 also includes a front fender 144 disposed at the front of the vehicle 100 and extending partially over the front wheel 121. Rearward of the seat 140, the vehicle 100 also has rear fender panels 146 extending at least partially over rear wheel 127. The vehicle 100 includes front headlights 145 attached to the front fork assembly 124 and electrically connected to a battery pack 210 (described further below). The vehicle 100 also has rear braking and indicator lights 147 supported by the rear panels 146 and electrically connected to the battery pack 210.

Depending on the particular embodiment, especially between different motorcycle types (trail-style motorcycle or cruiser-style motorcycle for example), the body panels 142 and the fenders 144, 146 could be different in shape and number. For example, some embodiments of the vehicle 100 could include a mud flap connected to a rear edge of one of the body panels 142. It is further contemplated that one or both of the fenders 144 and rear panels 146 could be omitted in some cases.

A driver footrest 126 is disposed on either side of the vehicle 100 and vertically lower than the straddle seat 140 to support the driver's feet. The driver footrests 126 are connected to the frame members 118. It is contemplated that the footrests 126 could be implemented in various forms other than those illustrated, including but not limited to pegs and footboards. It is contemplated that the vehicle 100 could also be provided with one or more passenger footrests disposed rearward of the driver footrest 126 on each side of the vehicle 100, for supporting a passenger's feet when a passenger seat portion for accommodating a passenger is connected to the vehicle 100. A brake pedal 128 is connected to the right driver footrest 126 for braking the vehicle 100. The brake pedal 128 extends upwardly and forwardly from the right driver footrest 126 such that the driver can actuate the brake pedal 128 with a front portion of the right foot while a rear portion of the right foot remains on the right driver footrest 126.

Figure 4:
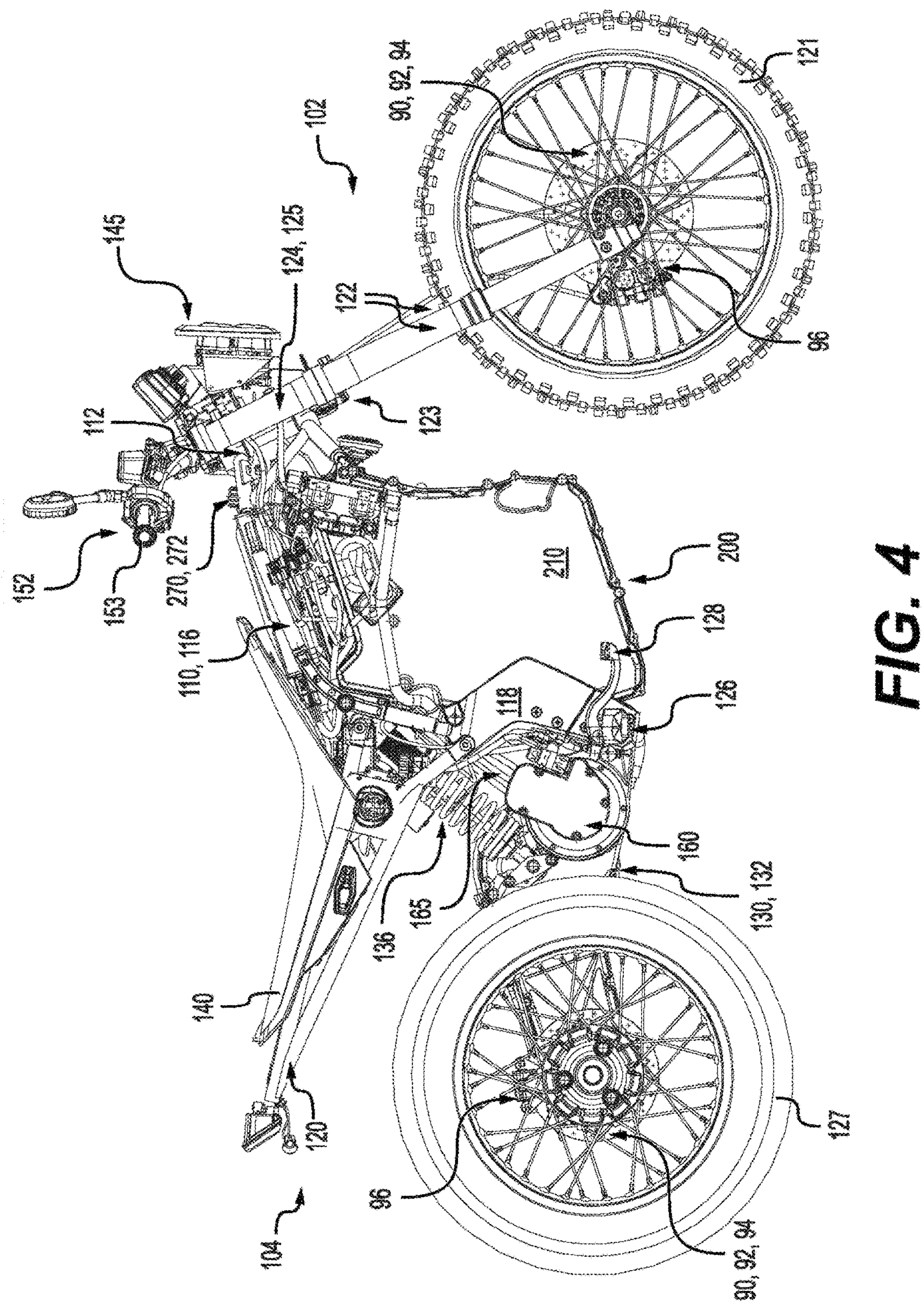
FIG. 4 is a right side elevation view of the vehicle of FIG. 1, with body panels having been removed.
Figure 5:
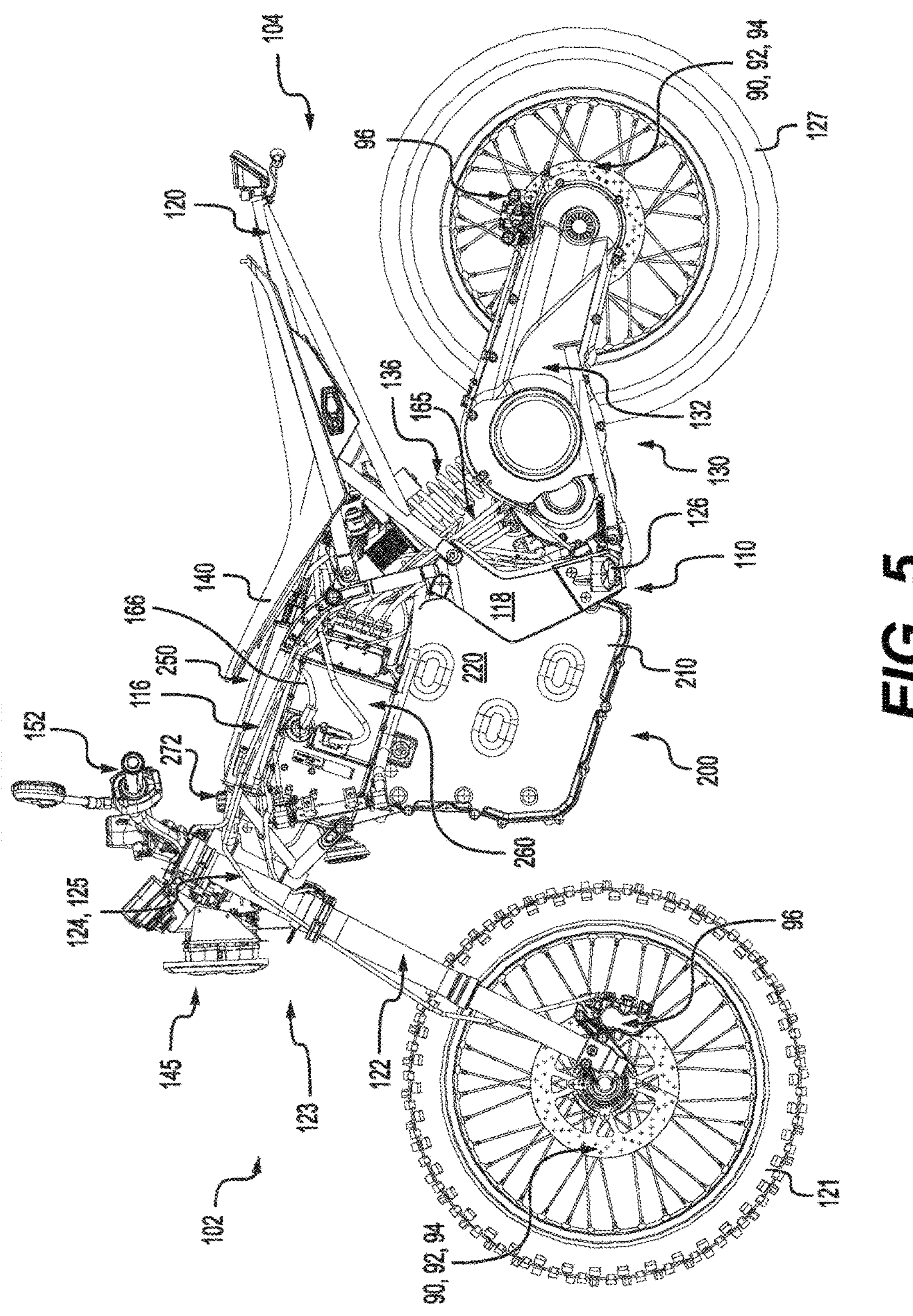
FIG. 5 is a left side elevation view of the vehicle of FIG. 1, with body panels having been removed.

With reference to FIGS. 3 to 5, each of the front wheel 121 and the rear wheel 127 is provided with a brake assembly 90. The brake assemblies 90 of the wheels 121, 127, along with the brake pedal 128, form part of a brake system 92. Each brake assembly 90 is a disc-type brake mounted onto the spindle of the respective wheel 121 or 127. Other types of brakes are contemplated. Each brake assembly 90 includes a rotor 94 mounted onto the wheel hub and a stationary caliper 96 straddling the rotor 94. The brake pads (not shown) are mounted to the caliper 96 so as to be disposed between the rotor 94 and the caliper 96 on either side of the rotor 94. The brake pedal 128, as well as a hand-operated brake lever 155 described below, are operatively connected to the brake assemblies 90 provided on each of the front wheel 121 and the rear wheel 127. The brake system 92 further includes a regenerative braking system (not shown) that uses the electric motor 160 as a generator to charge battery cells of the battery pack 210 while slowing the vehicle 100.

Returning to FIGS. 1 to 5, the vehicle 100 includes a handlebar assembly 152 operatively connected to the front fork assembly 124 and disposed in front of the seat 140. The handlebar assembly 152 is used by the rider to turn the front wheel 121, via the front fork assembly 124, to steer the vehicle 100. Specifically, the handlebar assembly 152 is connected to a top end of the triple clamp assembly 125. The handlebar assembly 152 and the triple clamp assembly 125 define a steering axis about which the front wheel 121 turns to steer the vehicle 100. A twist-grip throttle 153 is operatively connected on the right side of the handlebar assembly 152 for controlling vehicle speed. It is contemplated that the twist-grip throttle 153 could be replaced by a throttle lever or some other type of throttle input device. The twist-grip throttle 153 could be disposed on the left side of the handlebar assembly 152 in some embodiments. The handlebar assembly 152 also includes the brake lever 155 on a right side for activating the brake assemblies 90.

It is contemplated that the vehicle 100 could include a variety of different features excluded from discussion here, including but not limited to: a windscreen, radio and/or navigational systems, and luggage rack systems.

The vehicle 100 further includes an electronic powerpack 200, an electric motor 160, and a drivetrain 170 for driving the vehicle 100, specifically the rear wheel 127. The powerpack 200 will be described in more detail below.

With reference to FIGS. 6 to 10, the electric motor 160 is disposed in the swing arm 132. As the swing arm 132 pivots relative to the frame 110, the motor 160 moves with the swing arm 132. In the present embodiment, the motor 160 is a three-phase electric motor 160. It is contemplated that different types of motors could be used in some embodiments.

The swing arm housing 134 defines a motor cavity 135 therein in which the motor 160 is disposed (FIG. 8). The motor 160 is operatively connected to the drivetrain 170 disposed in the swing arm 132, as is illustrated in FIG. 6, in which the housing cover 137 has been removed to show the drivetrain 170. An output shaft 161 of the motor 160 has a gear 171 disposed thereon for engaging the drivetrain 170. The drivetrain 170 includes a gear wheel 172, a front sprocket 174 connected to the gear wheel 172 and a rear sprocket 176. The sprocket 174 engages a belt 178 which in turn engages the sprocket 176. A belt tensioner 177 presses against the lower part of the belt 178 between the sprockets 174, 176.

Power is provided to the motor 160 by the electronic powerpack 200. Illustrated in additional detail in FIGS. 6, 7, 10, and 12, the powerpack 200 is supported by the frame 110. In the present embodiment, the powerpack 200 is connected to the frame members 118 but different embodiments could have different structural arrangements for connecting the powerpack 200 to the frame 110.

Figure 13:
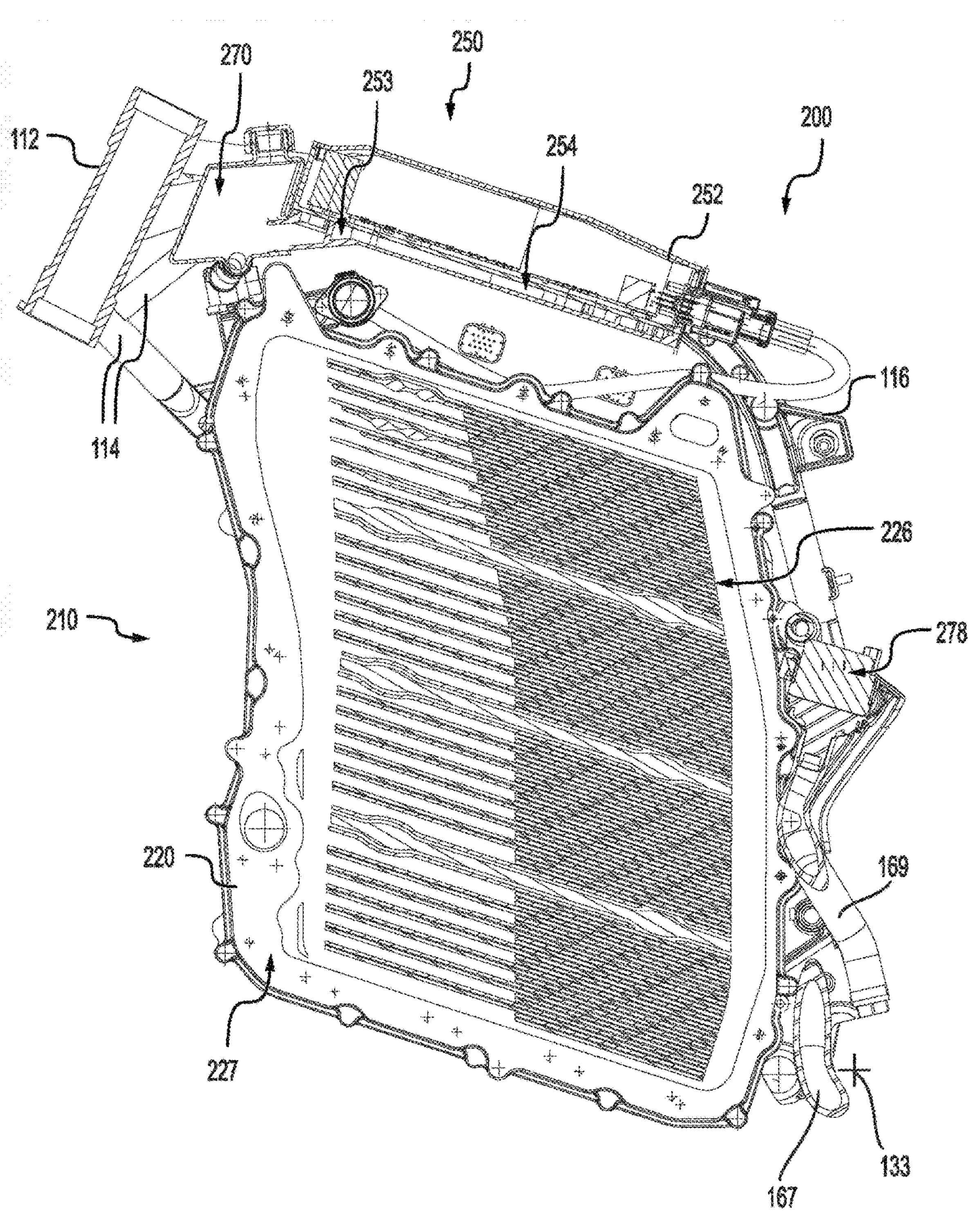
FIG. 13 is a cross-sectional view of portions of the powerpack of FIG. 6, taken along line 13-13 of FIG. 9.

The powerpack 200 includes a battery pack 210. The battery pack 210 includes a battery housing 220. The battery housing 220 is fastened to the frame 110 to support the powerpack 200 in the illustrated embodiment. As best seen in FIG. 13, in the present embodiment, the battery pack 210 is completely forward of the swing arm pivot axis 133. The battery pack 210 includes a plurality of battery cells 230 housed in the battery housing 220, illustrated schematically in FIGS. 6 and 16. Depending on the particular implementational details of a given embodiment of the vehicle 100, the specific implementation details of the battery pack 210 and/or the plurality of battery cells 230 could vary. For example, battery cells could vary in nominal energy capacity, usable energy capacity discharge rate, cell chemistry and cell type.

The powerpack 200 includes a charger 250 connected to the battery pack 210. The charger 250 includes a charger housing 252 surrounding internal electronic components (not shown) of the charger 250. The charger 250 is mounted to the battery housing 220. Specifically, the charger housing 252 is fastened to the battery housing 220 and is disposed on a top side of the battery housing 220. It is contemplated that the location of the charger 250 relative to the battery pack 210 could vary.

The charger 250 is electrically connected to the battery cells 230 for supplying charge to the battery cells 230. The vehicle 100 includes a socket 258 electrically connected to the charger 250 for electrically connecting to an external power source for providing electricity to the charger 250 for charging the battery cells 230. The socket 258 is disposed generally rearward of the charger 250 and extends at least partially through one of the body panels 142, but the specific location could vary.

The powerpack 200 also includes an inverter 260 disposed on a left side of the battery pack 210. The inverter 260 includes an inverter housing 262 which is fastened to the battery housing 220, specifically along a left side of the battery housing 220. As such, the inverter 260 is mounted to the battery housing 220. In some embodiments, it is contemplated that the inverter 260 could be disposed on a different side of the battery pack 210.

Figure 17:
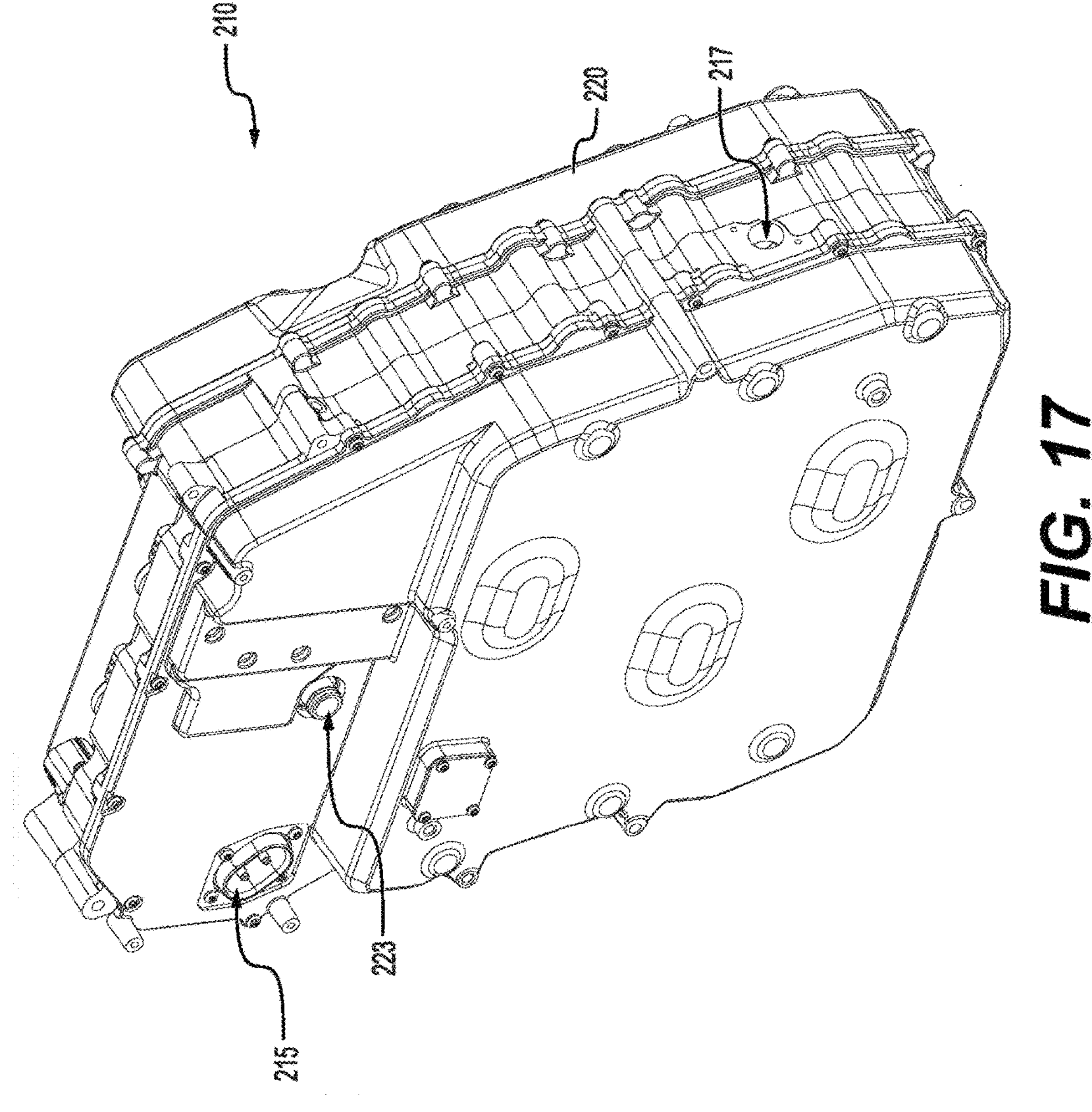
FIG. 17 is a rear, left side perspective view of a battery pack of the powerpack of FIG. 6.
Figure 18:
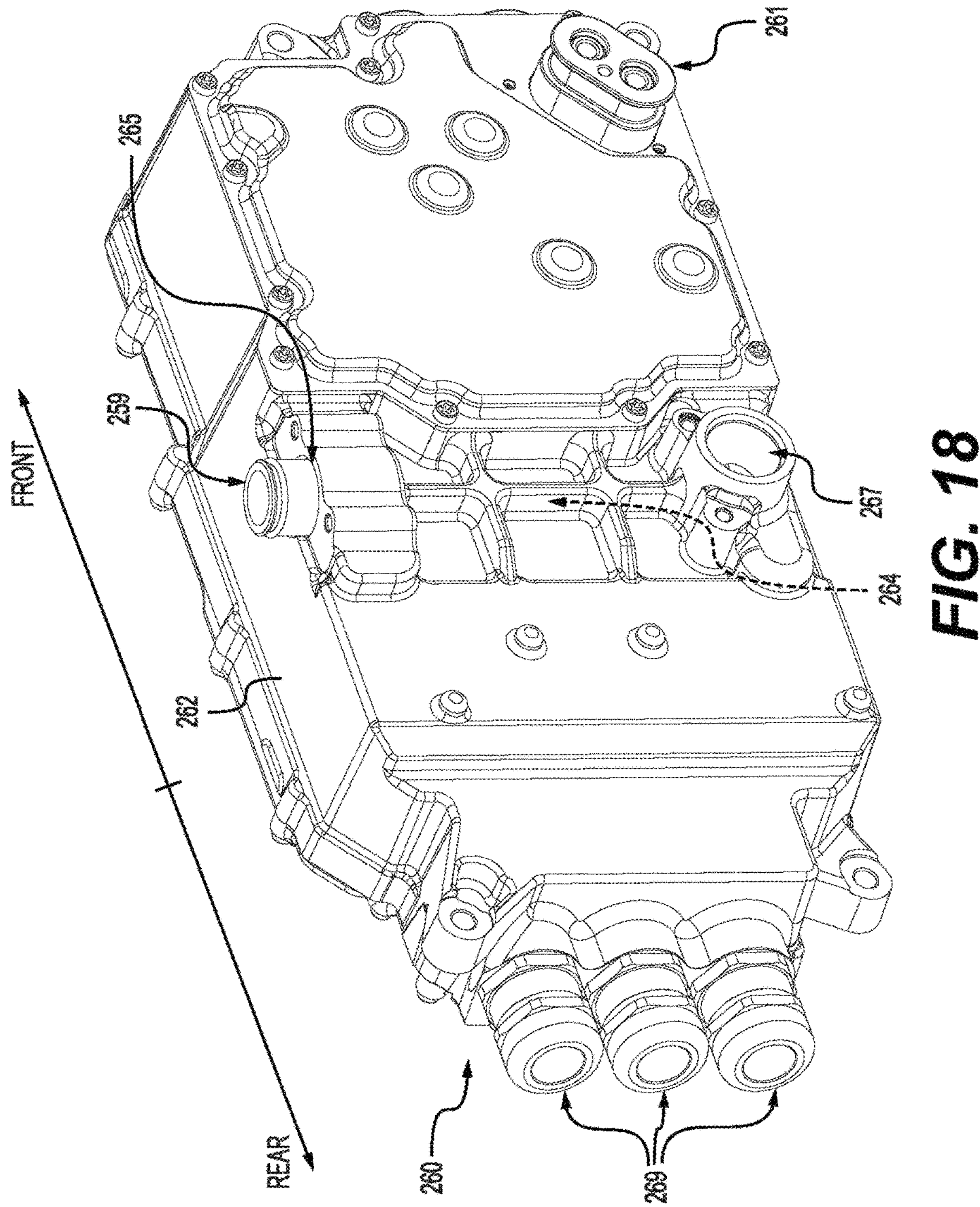
FIG. 18 is a top, rear, right side perspective view of an inverter and a rigid connector of the powerpack of FIG. 6.
Figure 19:
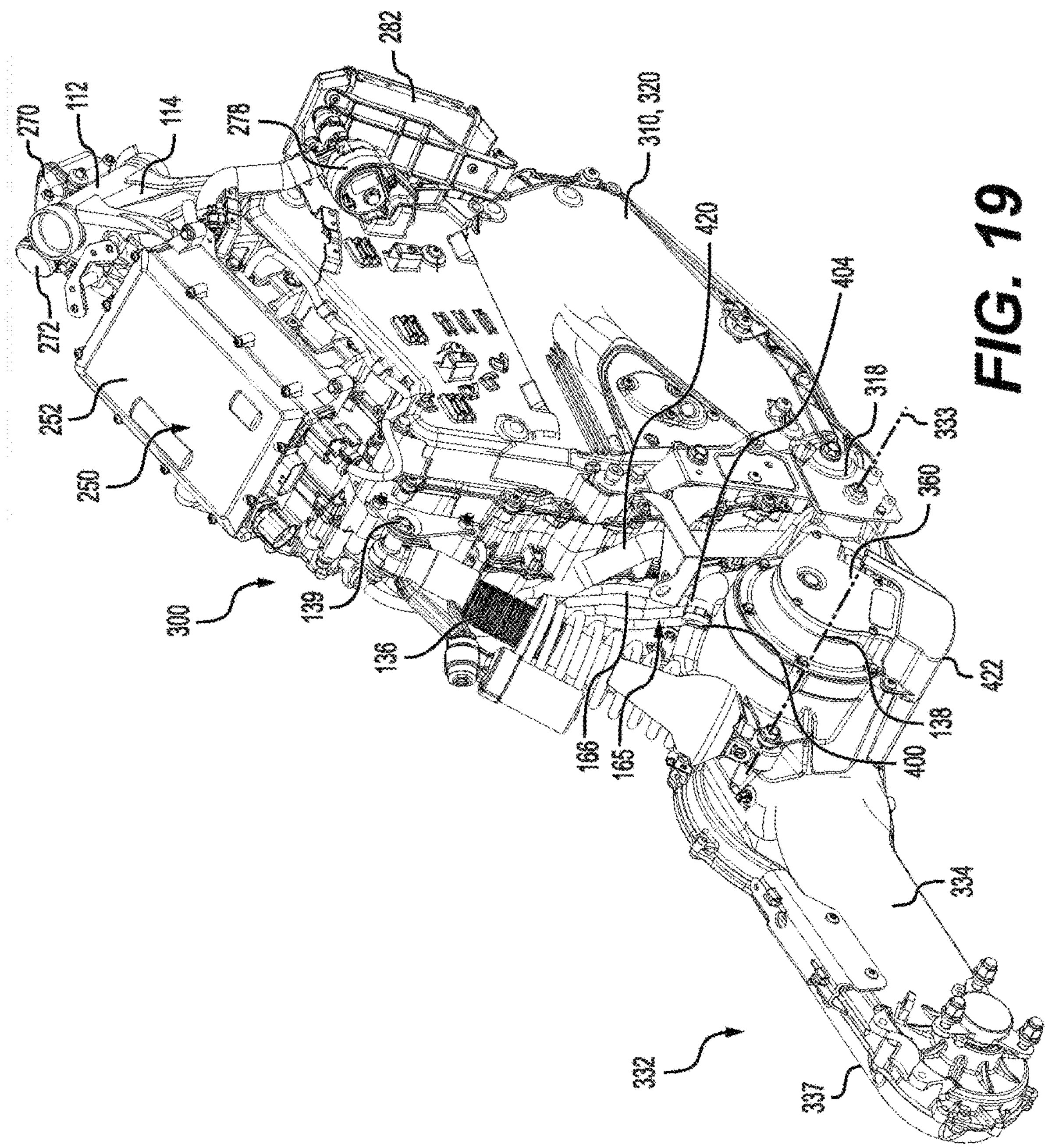
FIG. 19 is a perspective view taken from a rear, right side of an alternative embodiment of a frame, a powerpack, a drivetrain, and a rear suspension assembly of the vehicle of claim 1.

In order to electrically connect to the battery cells 230 in the battery pack 210, the inverter 260 includes an electric connector 261 disposed on an exterior of the invertor housing 262 (see FIG. 18). The battery pack 210 includes an electric connector 215 electrically connected to the battery cells 230 and disposed on an exterior of the battery housing 220, specifically on a left side of the housing 220 (see FIG. 17). When the vehicle 100 is in operation, the inverter 260 receives electric power from the battery cells 230 via the electric connector 215 and the electric connector 261.

The connector 215 is arranged to receive the connector 261 of the inverter 260, such that the electric connector 215 and the electric connector 261 are selectively connected together for managing electricity flow from the battery pack 210 to other electronic components of the vehicle 100. As can be seen in at least FIG. 6, the inverter 260 is electrically connected to the three-phase motor 160 via three power cables 165 connected to three outlets 269 of the inverter 260 to supply power from the inverter 260 to the electric motor 160. As can be seen in FIG. 5, a control cable 166 is electrically connected between the inverter 260 and the electric motor 160 to transmit control signals from the inverter 260 to the electric motor 160. The number of cables or type of electrical connection between the inverter 260 and the motor 160 could vary in different embodiments. While the inverter 260 connects directly to the battery pack 210 in the present embodiment, it is contemplated that the inverter 260 could be separated and spaced from the battery pack 210 and electrically connected to the battery cells 230 via power cables or the like.

Figure 11:
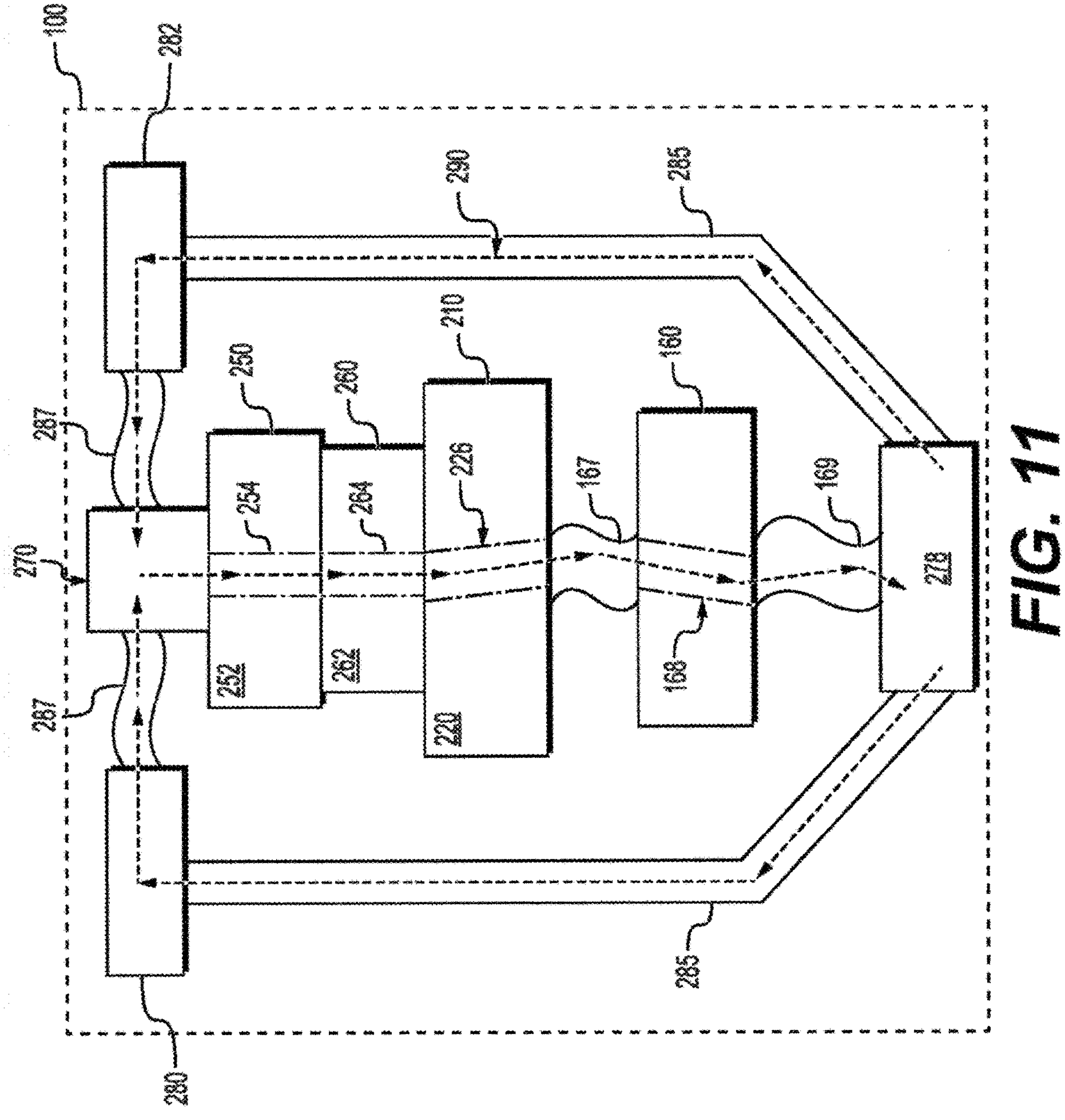
FIG. 11 is a schematic diagram of a cooling circuit of the vehicle of FIG. 1.

According to non-limiting embodiments of the present technology, the vehicle 100 includes a cooling circuit 290, illustrated schematically in FIG. 11, for cooling electronic components of the vehicle, including the powerpack 200 and the motor 160. With additional reference to FIGS. 12 to 18, the cooling circuit 290 is in the form of a closed fluid cooling loop 290 for absorbing heat from the motor 160 and components of the powerpack 200. Heat transfer in the cooling circuit 290 is provided by a liquid coolant, generally a glycol-water coolant, although it is contemplated that different liquid coolants could be utilized. It is noted that while liquid coolant is provided, some gases may also be present in the cooling circuit 290, due to phase transitions or air infiltrations.

In some embodiments, it is contemplated that the cooling circuit 290 could be limited to the powerpack 200 and cooling of the motor 160 could be provided by other means. It is also contemplated that some components of the powerpack 200 could be omitted from the cooling circuit 290 and cooling could be provided by other means. For example, some components of the vehicle 100 could be cooled through air cooling.

The vehicle 100 includes a coolant reservoir 270 connected to the powerpack 200 and fluidly connected to the cooing circuit 290. The reservoir 270 receives liquid coolant therein and supplies coolant to the cooling circuit 290. It is noted that the cooling circuit 290 is considered a "closed loop" in that the coolant flowing through the cooling circuit 290 absorbs heat from heat-generating components and radiates that heat away using heat exchangers (described below) without exchanging the coolant fluids. The reservoir 270 includes a reservoir cap 272 selectively connected thereto. The reservoir 270 provides for coolant to be refilled or supplemented if necessary. When the cap 272 is removed, additional coolant fluid can be added to the reservoir 270 to supplement the fluid level of coolant in the cooling circuit 290. It is contemplated that the coolant reservoir 270 could be omitted in some embodiments and that coolant fluid could be added elsewhere in the cooling circuit 290.

Figure 12:
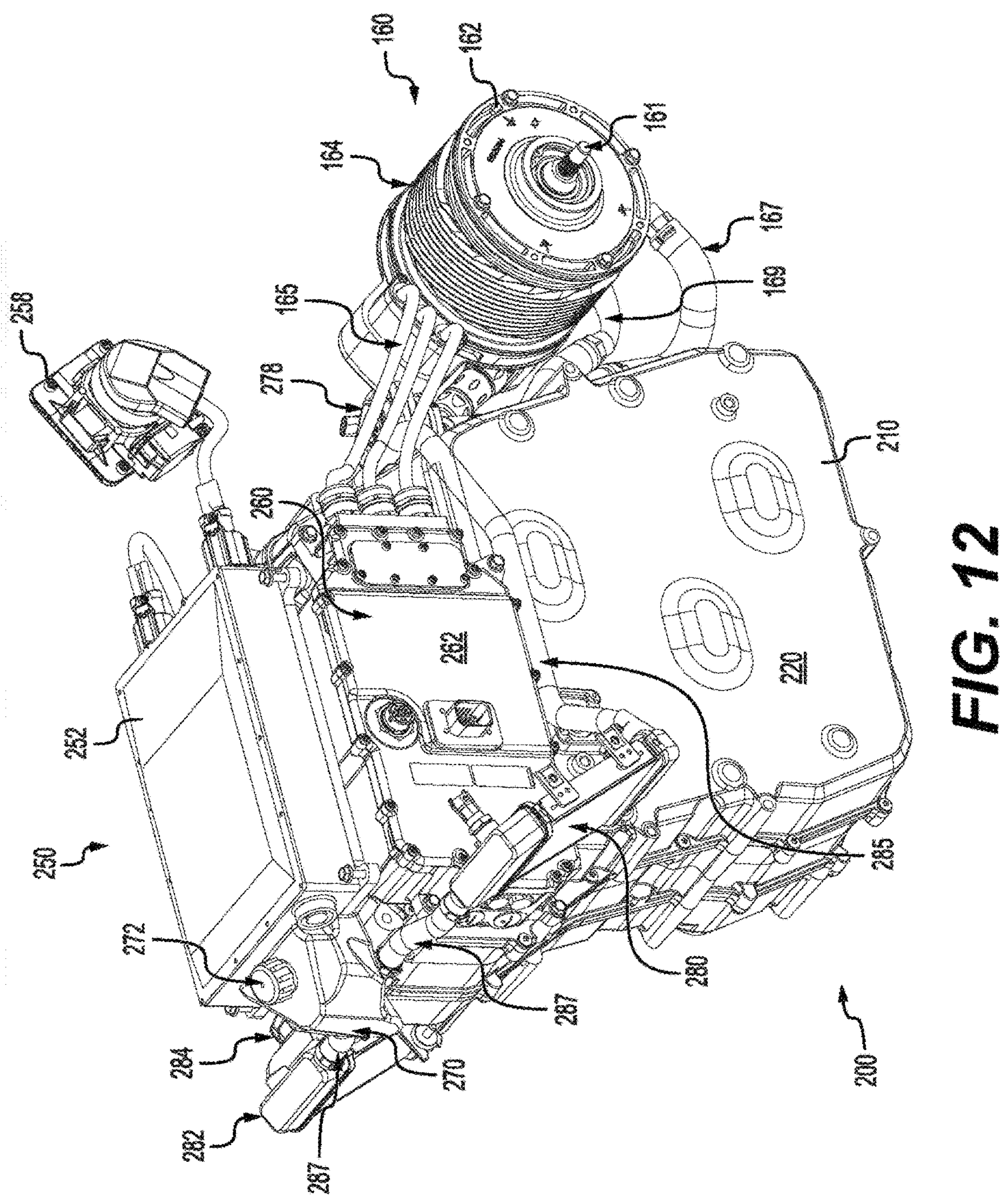
FIG. 12 is a top, front, left side perspective view of the powerpack, the motor, and the cooling circuit components of the vehicle of FIG. 1.

As can be seen in FIG. 12, the reservoir 270 is disposed partially forward of the powerpack 200. It is contemplated that the exact positioning of the reservoir 270 could vary in different embodiments. The reservoir 270 is supported by the powerpack 200; specifically the reservoir 270 is connected to the charger 250 (described further below). It is contemplated that the reservoir 270 could be supported by a different component of the powerpack 200 or the vehicle 100. For example, it is contemplated that the reservoir 270 could be connected to and/or supported by the frame 110 in some embodiments.

Figure 14:
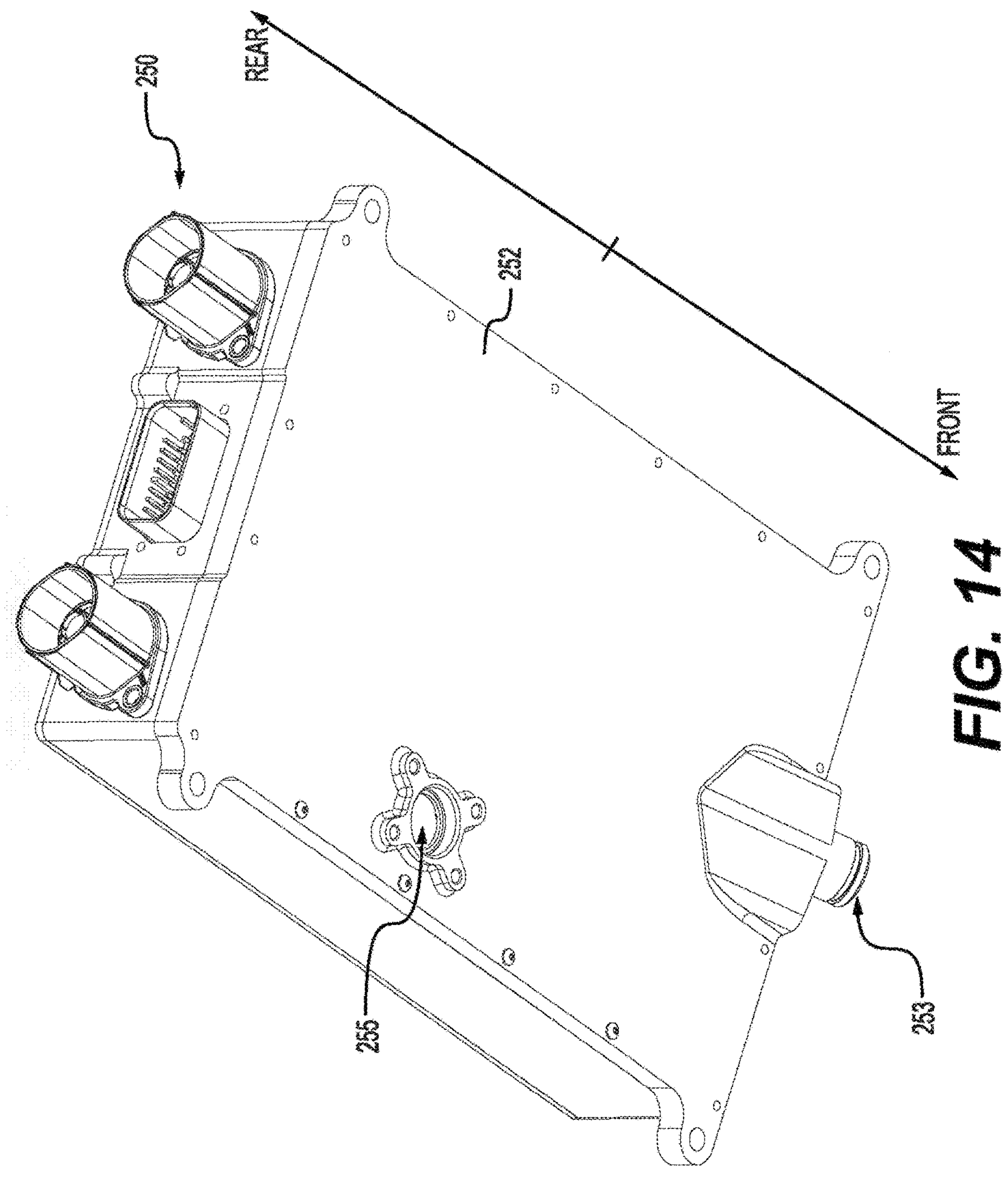
FIG. 14 is a bottom, rear, left side perspective view of a charger of the powerpack of the vehicle of FIG. 1.
Figure 15:
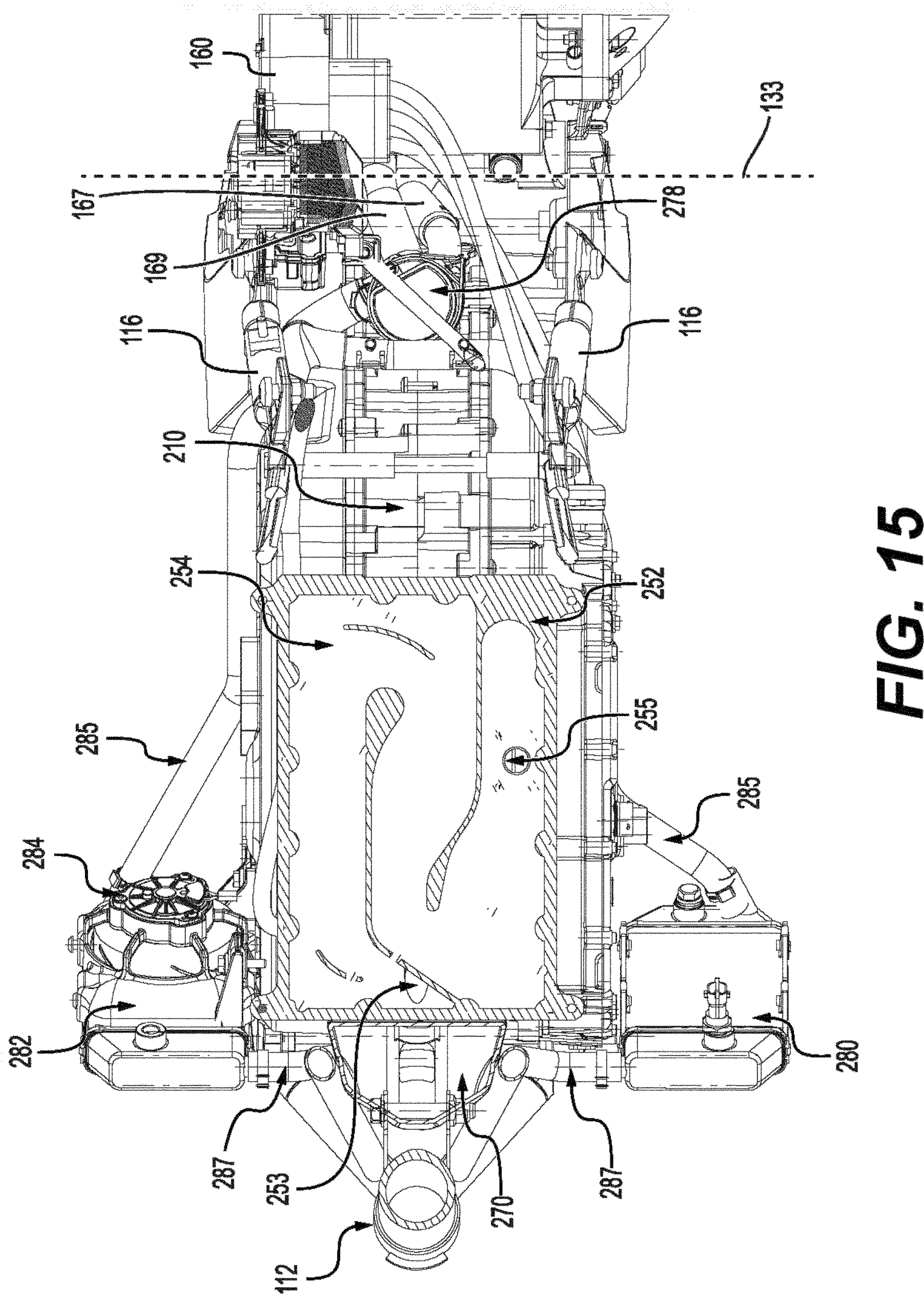
FIG. 15 is a cross-sectional view of portions of the powerpack of FIG. 6, taken along line 15-15 of FIG. 10.

With reference to FIGS. 13 to 15, the charger housing 252 defines a charger cooling channel 254 therein. The charger cooling channel 254 extends generally horizontally along a bottom side of the charger 250. As such, the charger cooling channel 254 extends along a side of the charger 250 facing an interior of the powerpack 200. The shape of the present embodiment of the channel 254 is illustrated cross-section in FIG. 15, but it is contemplated that the exact shape could vary.

As seen in FIG. 13, the charger 250 includes a channel inlet 253 that is defined in a front, bottom portion of the housing 252. The inlet 253 is fluidly connected to the channel 254. The inlet 253 extends downward and forward, into the coolant reservoir 270, thereby forming a rigid fluid connection between the charger cooling channel 254 and the coolant reservoir 270. In such an arrangement, coolant flows from the reservoir 270 to the charger cooling channel 254 without the use of piping or hose between the reservoir 270 and the charger 250. A channel outlet 255 (FIGS. 14 and 15) is defined on the bottom side of the charger housing 252 and is fluidly connected to the channel 254.

Figure 16:
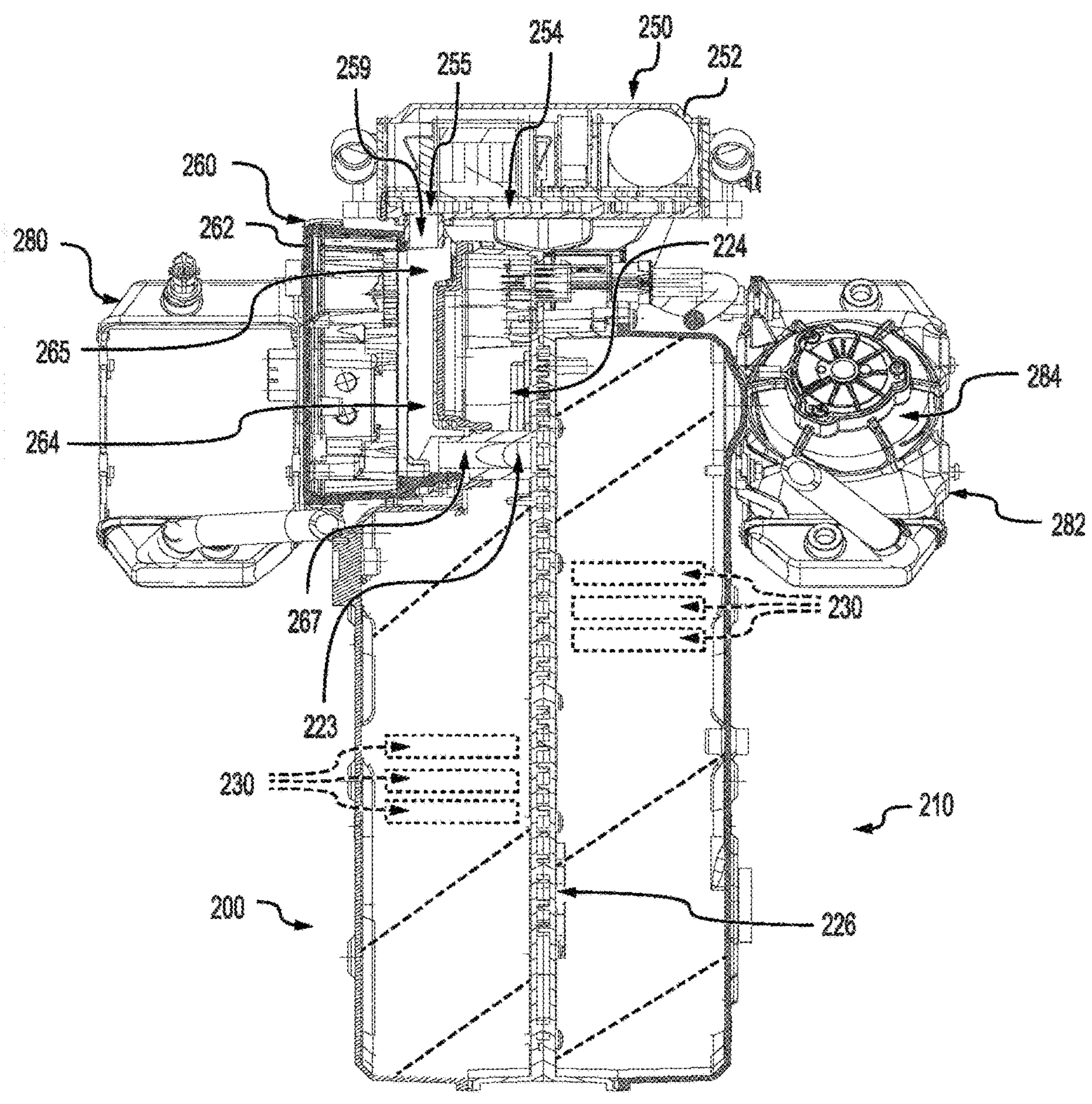
FIG. 16 is a cross-sectional view of portions of the powerpack of FIG. 6, taken along line 16-16 of FIG. 10, with battery cells therein being illustrated schematically.

With reference to FIGS. 16 and 18, the inverter housing 262 defines an inverter cooling channel 264 therein. The inverter cooling channel 264 extends generally vertically along and across a right side of the inverter 260. As such, the inverter cooling channel 264 extends along a side of the inverter 260 facing the interior of the powerpack 200. The shape of the present embodiment of the channel 264 is illustrated in FIGS. 16 and 18, but it is contemplated that the exact shape could vary.

The inverter 260 defines a channel inlet 265 on a top side of the housing 262, fluidly communicating with the channel 264. As can be seen in FIG. 16, the inlet 265 is disposed below the outlet 255 of the charger cooling channel 254. In the present embodiment, the powerpack 200 further includes a rigid tube 259, also referred to as a ring 259, for fluidly and rigidly connecting the charger cooling channel 254 to the inverter cooling channel 264. It is contemplated that the housings 252, 262 could be formed to fit sealingly directly together, omitting the tube 259. The inverter 260 also defines a channel outlet 267 on a right side of the housing 262, fluidly communicating with the channel 264.

As is illustrated in more detail in FIGS. 13 and 16, the battery housing 220 defines a battery cooling channel 226 therein. The battery cooling channel 226 extends through a center portion of the battery pack 210, in the interior of the powerpack 200. As can be seen in the cross-sectional views of FIGS. 13 and 16, the battery cooling channel 226 includes a plurality of fins extending inward from the housing 220 and coolant fluid flows along a longitudinal direction through a center portion 227 of the housing 220, along the direction of the centerplane 103, as well as along a vertical/lateral plane of the vehicle 100 (orthogonal to the centerplane 103), descending toward a battery cooling channel outlet 217 (FIG. 17). By being disposed in the center portion 227 of the housing 220, the channel 226 is in thermal communication with banks of battery cells 230 disposed on both a right side of the channel 226 and a left side of the channel 226.

The battery pack 210 includes a channel inlet 223 formed by the battery housing 220, the inlet 223 fluidly communicating with the channel 226 (see FIGS. 16 and 17). The housing 220 also defines a channel portion 224 extending from the inlet 223 to the generally vertically extending cooling channel 226. In some embodiments, the channel portion 224 could be omitted, with the inlet 223 aligning with a top portion of the vertically extending channel 226 for example.

As can be seen in FIG. 16, the outlet 267 of the inverter cooling channel 264 is connected to the inlet 223 of the battery cooling channel 226. The housings 262, 220 fit sealingly together, such that the inverter cooling channel 264 and the battery cooling channel 226 fluidly connected together by a rigid fluid connection formed by the housings 262, 220. In the illustrated embodiment, the electric connector 261 and the inverter channel outlet 267 are disposed on a same side of the inverter 260. In this arrangement, both the cooling connection and the electrical connection between the inverter 260 and the battery pack 210 are internal to the powerpack 200. As is further illustrated in FIG. 16, connections between the battery cooling channel 226, the inverter cooling channel 264, and the charger cooling channel 254 are internal to the powerpack 200. In this way, no hoses are required to make these connections, and the connections between the channels 226, 264, 254 are generally protected from interference from external to the vehicle 100.

It is noted that the terms "inlet" and "outlet" are not meant to limit the direction of flow through the charger 250, the inverter 260, and the battery pack 210. In embodiments where the direction of flow of coolant through the cooling circuit 290 is reversed, coolant would flow into the openings labelled outlets, including the charger channel outlet 255, the inverter channel outlet 267, and the battery channel outlet. Similarly, with the flow through the cooling circuit 290 reversed, coolant could flow out of the openings labelled inlets, including the charger channel inlet 253, the inverter channel inlet 265, and the battery channel inlet 223.

With reference to FIGS. 8 and 12, the electric motor 160 includes a motor housing 162. The motor housing 162 includes a channeled outer surface 164 in thermal contact with at least some internal components, including at least a stator and a rotor (not shown), of the motor 160. The vehicle 100 thus includes a motor cooling channel 168 (shown schematically in FIG. 11) for cooling the electric motor 160. The channel 168 is formed between the channeled outer surface 164 and an internal surface of the motor cavity 135 in which the motor 160 is disposed. The motor cooling channel 168 formed by the channeled outer surface 164 forms a spiral winding around an exterior of the electric motor 160. In some embodiments, the shape of the channel 168 could vary.

The motor cooling channel 168 is fluidly connected to the battery cooling channel 226 and forms a portion of the cooling circuit 290. Specifically, the motor cooling channel 168 is connected to the channel outlet 217 of the battery cooling channel 226 by a flexible tube 167, also referred to as a hose 167. With reference to FIGS. 10, 12, 13 and 15, with the vehicle 100 at rest, a front end of the hose 167 is forward and vertically higher than the swing arm pivot axis 133 and a rear end of the hose 167 is rearward of the swing arm pivot axis 133 and in part vertically lower than the swing arm pivot axis 133. The hose 167 extends in a space defined laterally between the frame members 118 and longitudinally between the battery pack 210 and the motor 160. The swing arm pivot axis 133 extends through this space. As the motor 160 moves with the swing arm 132 relative to the frame 110, and thus the powerpack 200, flexible connections are needed to maintain fluid connection between portions of the cooling circuit 290 in the powerpack 200 and portions of the cooling circuit 290 in thermal communication with the motor 160. To reduce the movement of the hose 167 as the motor 160 moves with the swing arm 132 relative to the frame 110, part of the hose 167 is disposed at a radial distance from the swing arm pivot axis 133 that is less than twice a diameter of the hose 167. In other embodiments, this radial distance is less than 1.5 times the diameter of the hose 167. In other embodiments, this radial distance is less than the diameter of the hose 167.

Figure 9:
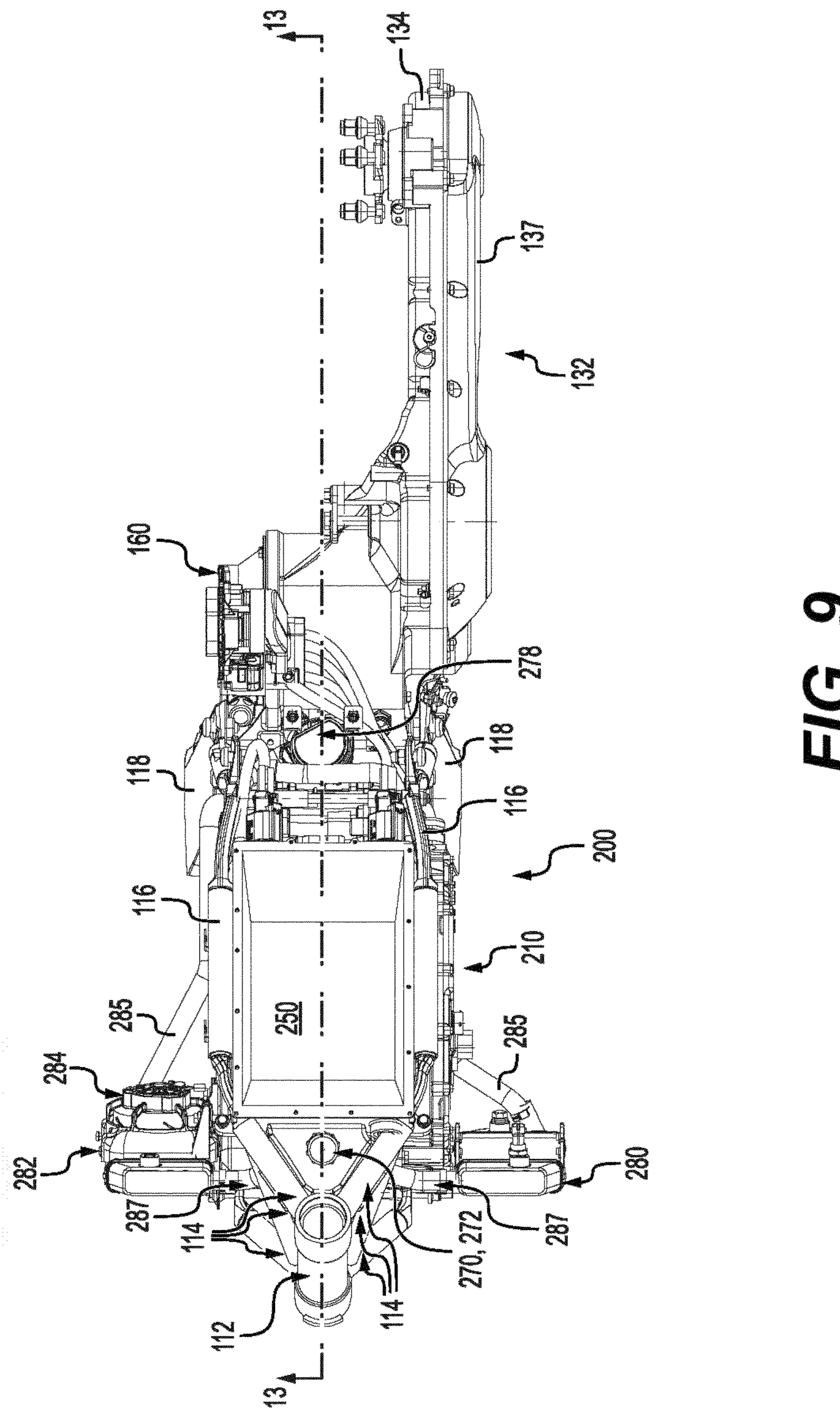
FIG. 9 is a top plan view of the components of FIG. 6 with the housing cover of the swing arm.
Figure 10:
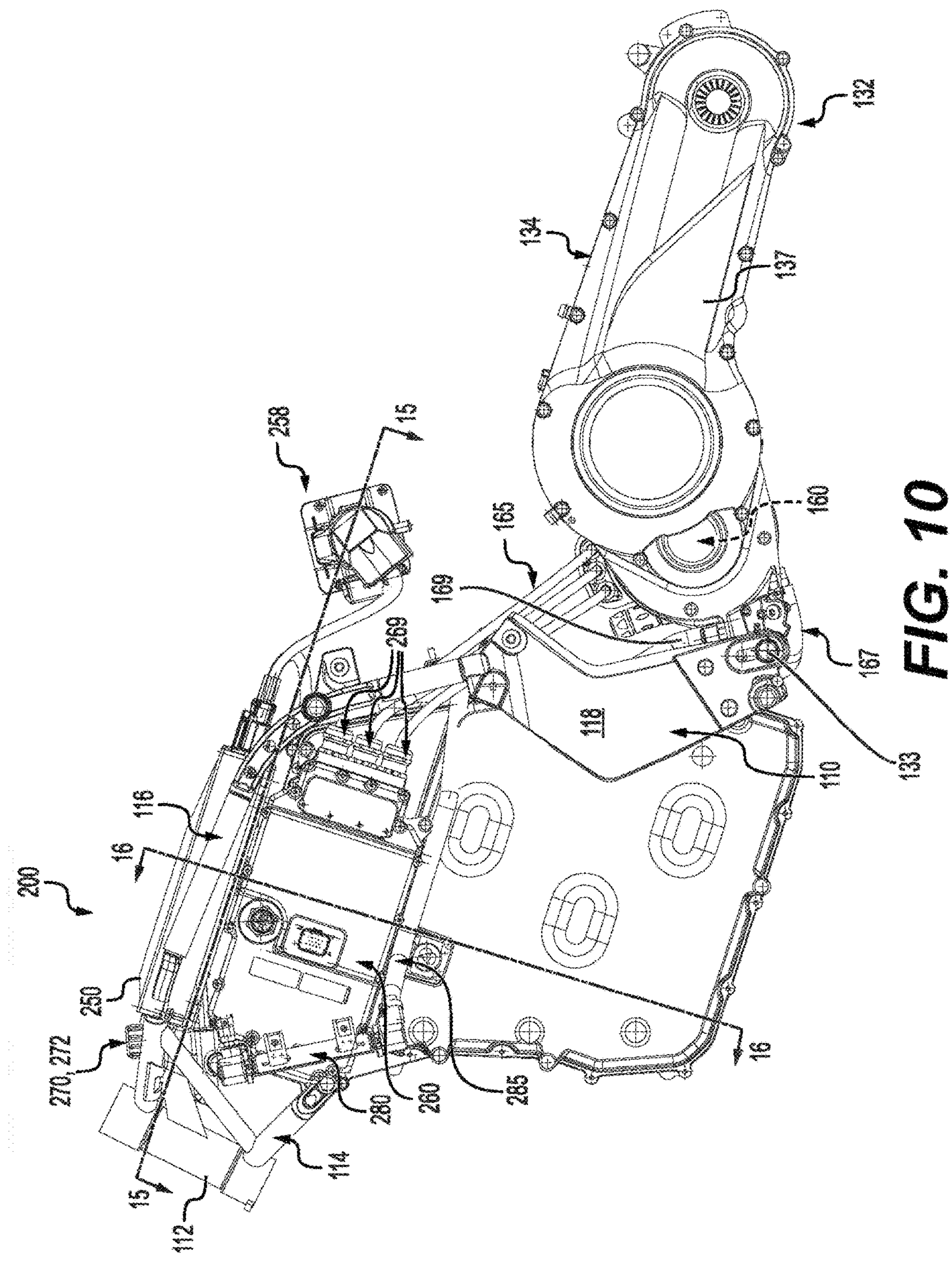
FIG. 10 is a left side elevation view of the components of FIG. 9.

With reference to FIGS. 9, 12, and 13, the vehicle 100 also includes a coolant pump 278 for circulating cooling through and forming a portion of the cooling circuit 290. In the illustrated embodiment, the coolant pump 278 is electrically connected to the battery pack 210 for powering the pump 278. The pump 278 is disposed partially rearward of the powerpack 200 in the present embodiment, although it is contemplated that placement of the pump 278 could vary. The pump 278 is fluidly connected to the motor cooling channel 168 by a flexible tube 169, also referred to as a hose 169. With reference to FIGS. 10, 12, 13 and 15, with the vehicle 100 at rest, a front end of the hose 169 is forward and vertically higher than the swing arm pivot axis 133 and a rear end of the hose 169 is rearward of the swing arm pivot axis 133 and in part vertically lower than the swing arm pivot axis 133. The hose 169 also extends in the space defined laterally between the frame members 118 and longitudinally between the battery pack 210 and the motor 160. As is noted above, the motor 160 pivots with the swing arm 132 relative to the frame 110 and further relative to the pump 278 which is also supported by the frame 110. The connection between the motor 160 and the pump 278 is thus also required to be flexible. To reduce the movement of the hose 169 as the motor 160 moves with the swing arm 132 relative to the frame 110, part of the hose 169 is disposed at a radial distance from the swing arm pivot axis 133 that is less than twice a diameter of the hose 169. In other embodiments, this radial distance is less than 1.5 times the diameter of the hose 169. In other embodiments, this radial distance is less than the diameter of the hose 169.

The vehicle 100 further includes two radiators for cooling the coolant fluid: a left radiator 280 disposed on a left side of the vehicle 100 and a right radiator 282 disposed on a right side of the vehicle 100. In the illustrated embodiment, the radiators 280, 282 are disposed partially forward of the powerpack 200, although exact placement could vary in different embodiments. Each radiator 280, 282 is fluidly connected to the cooling channels 254, 264, 226 of the powerpack 200 and forms a portion of the cooling circuit 290. Each radiator 280, 282 is arranged to receive airflow thereover during operation of the vehicle 100 to radiate heat away from the coolant via the radiators 280, 282.

The vehicle 100 includes two flexible tubes 285, with each tube 285 being connected between a corresponding one of the radiators 280, 282 and the pump 278. Each tube 285 extends along the corresponding right and left side of the powerpack 200. The left tube 285 is disposed generally vertically below the inverter 260, although exact placement of the tubes 285 could vary. The tubes 285, also referred to as hoses 285, further form a portion of the cooling circuit 290, as is illustrated schematically in FIG. 11. In at least some embodiments, the tubes 285 could be implemented as rigid tubing elements.

In the illustrated embodiment, the right radiator 282 includes a fan 284 connected to the housing of the radiator 282 to aid in increasing the cooling efficiency of the radiator 282. Depending on the embodiment, it is contemplated that the left radiator 280 could additionally or alternatively include a fan connected thereto. It is also contemplated that the fan 284 could be omitted in some cases.

With reference to at least FIG. 12, the vehicle 100 also includes flexible tubing components 287, also referred to as tubes 287 or hoses 287, fluidly connecting the radiators 280, 282 to the coolant reservoir 270 and forming a portion of the cooling circuit 290. As such, the tubes 287 fluidly connect each radiator 280, 282 to the battery cooling channel 226 via the coolant reservoir 270.

Returning to FIG. 11, flow of the cooling circuit 290 is schematically illustrated. Beginning at the coolant reservoir 270 (for simplicity of description), coolant flows from the reservoir 270 into the charger cooling channel 254. Coolant then flows into the inverter cooling channel 264 and then subsequently into the battery cooling channel 226. As is noted before, the coolant reservoir 270, the charger cooling channel 254, the inverter cooling channel 264, and the battery cooling channel 226 are rigidly fluidly connected together, without the use of tubes or hoses. From the battery cooling channel 226, coolant flows through the flexible tube 167 to the motor cooling channel 168. Coolant then flows from the channel 168 through the flexible tube 169 to the pump 278. Coolant is then subsequently returned by the pump 278 to forward portions of the vehicle 100 via tubes 285 on each of the right and left sides of the vehicle 100 to the radiators 280, 282. Having been at least partially cooled, coolant is then returned to the reservoir 270 via the hoses 287.

As is noted above, the direction of coolant flow could be reversed in at least some embodiments. The order of some components forming the cooling circuit 290 could be changed in some embodiments. As one non-limiting example, it is contemplated that coolant could flow through the radiators 280, 282 before the pump 278. While the order of the components along the cooling circuit 290 can vary, in the present embodiment the radiators 280, 282 are upstream from the cooling channels 254, 264, 226 of the powerpack 200. In this way, the powerpack components 250, 260, 210 which require more cooling may exchange more heat with the coolant in the cooling circuit 290 than subsequent components such as the motor 160 which are less sensitive to heating.

Turning now to FIGS. 19 to 27, an alternative embodiment of some of the components of the motorcycle 100 will be described. For simplicity, components illustrated in FIGS. 19 to 27 that are the same as those described above with respect to FIGS. 1 to 18 have been labeled with the same reference numerals and will not be described again in detail.

In this embodiment, the frame members 118 have been replaced by frame members 318. The frame members 318 are similar to the frame members 118 described above, but instead of being independent from each other like the frame members 118, the frame members 318 form part of a bracket having a lower cross-member 320 (FIG. 22) that connects the frame members 318 to each other.

The swing arm 132 has been replaced by a swing arm 332. The front of the swing arm 332 is received between lower portions of the frame members 318. The swing arm 332 pivots relative to the frame members 318 about a swing arm pivot axis 333 that extends through the lower intermediate frame members 318. The swing arm 332 includes a swing arm housing 334, in which is disposed an electric motor 360, which replaces the electric motor 160 in this embodiment, and a drivetrain (not shown) that is similar to the drivetrain 170. The swing arm housing 334 defines a motor cavity 335 (FIG. 23) therein in which the motor 160 is disposed. The swing arm 332 includes a housing cover 337 selectively removable from the housing 334. The swing arm housing 334 and the housing cover 337 enclose the drivetrain. As the swing arm 332 pivots about the pivot axis 333, the motor 360 moves with the swing arm 332. In the present embodiment, the motor 360, like the motor 160, is a three-phase electric motor 360. It is contemplated that different types of motors could be used in some embodiments. The shock absorber 136 is pivotally connected at one end to the swing arm 332 about a shock absorber pivot axis 138 and at the other end to a bracket 139 that forms part of the frame.

Figure 20:
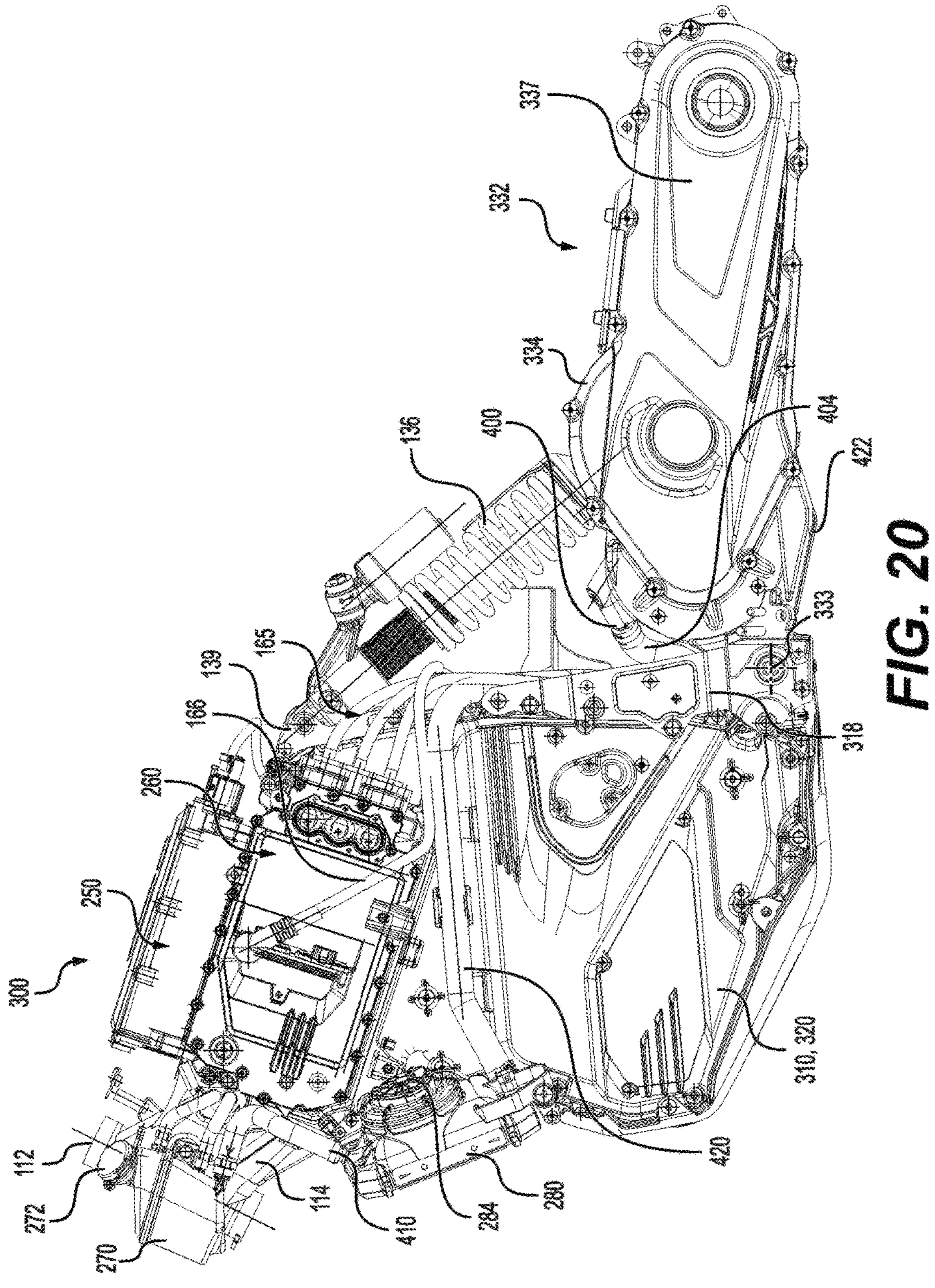
FIG. 20 is a left side elevation view of the components of FIG. 19.
Figure 25:
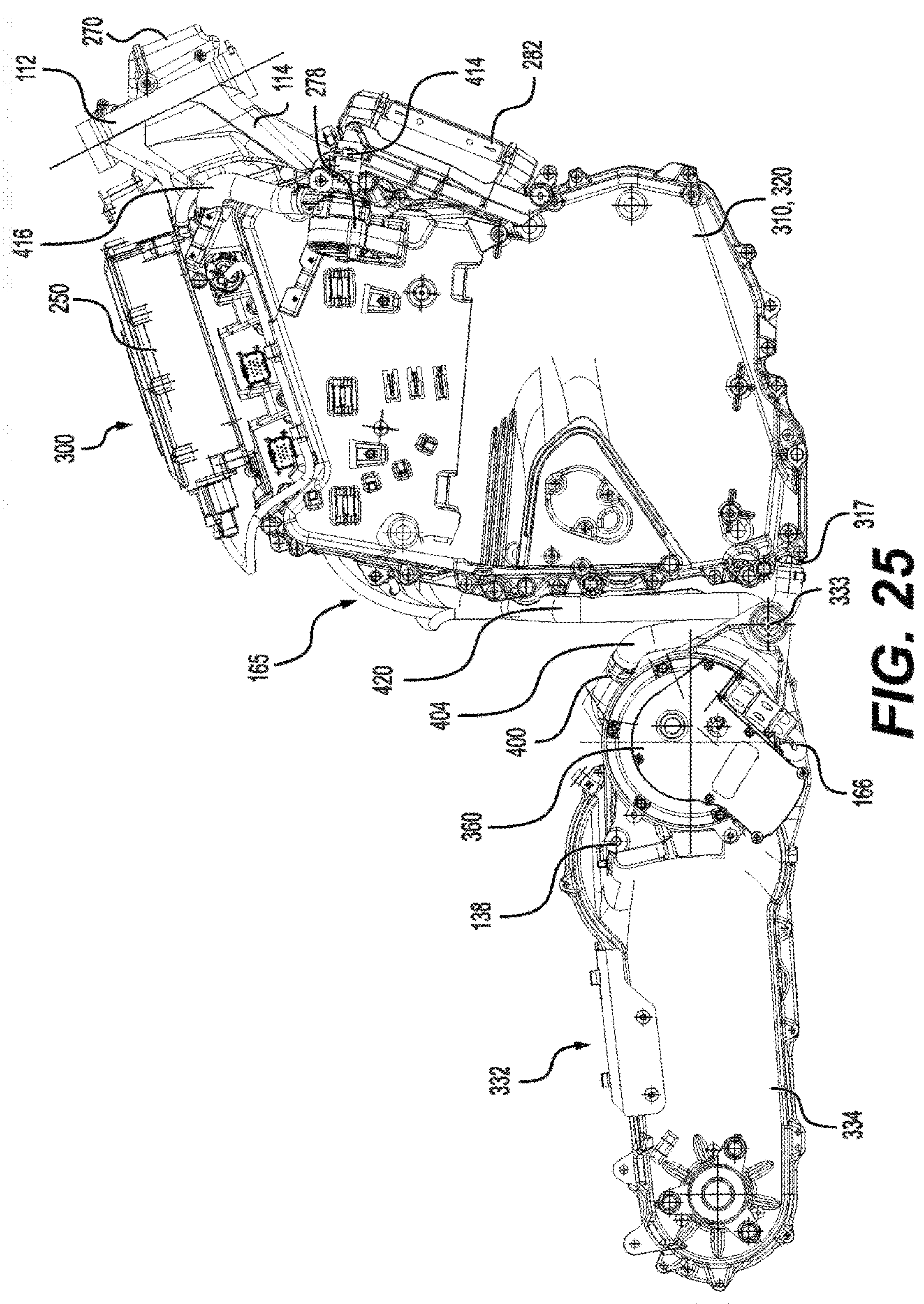
FIG. 25 is a right side elevation view of the components of FIG. 19, with a cover and part of the frame being omitted.
Figure 26:
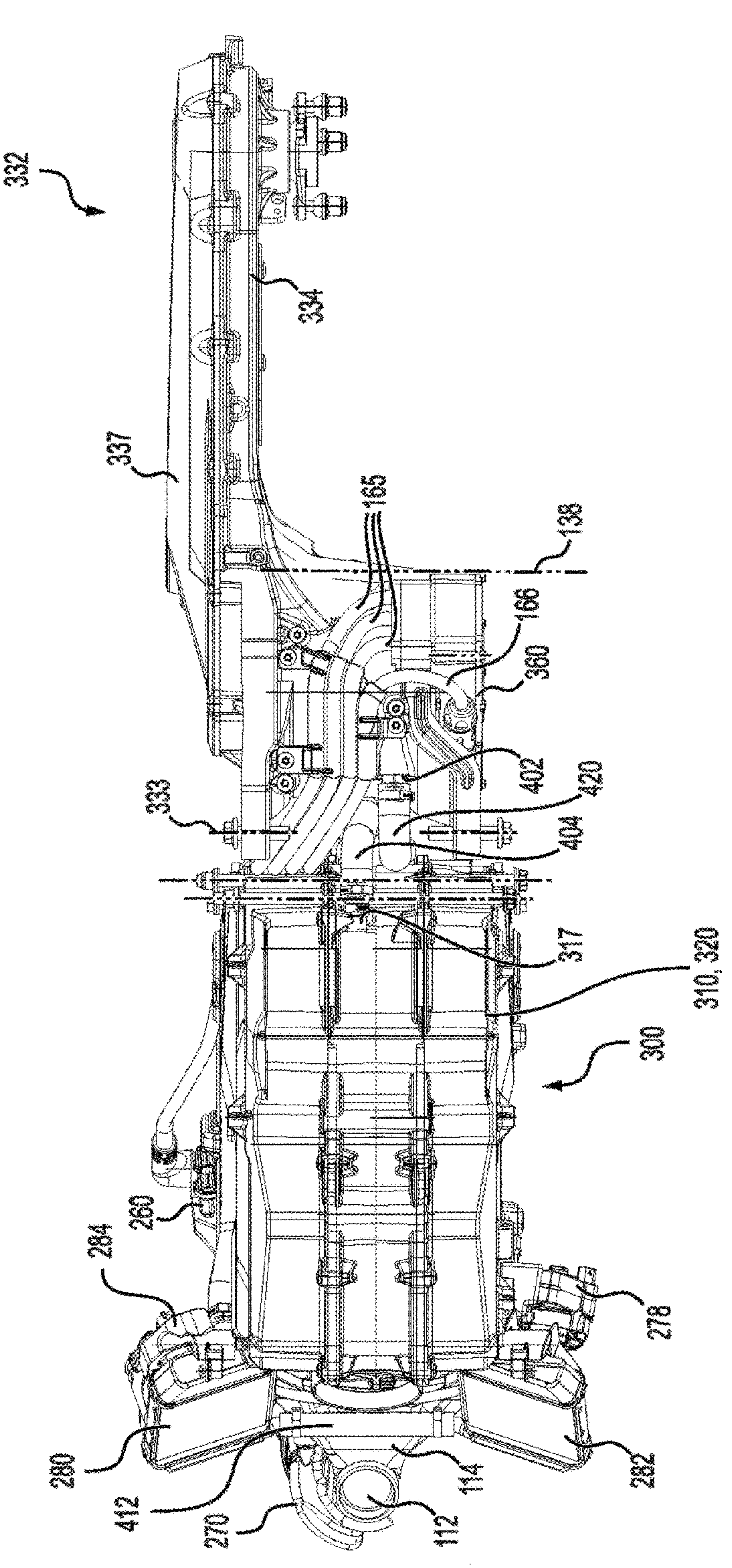
FIG. 26 is a bottom view of the components of FIG. 25.
Figure 27:
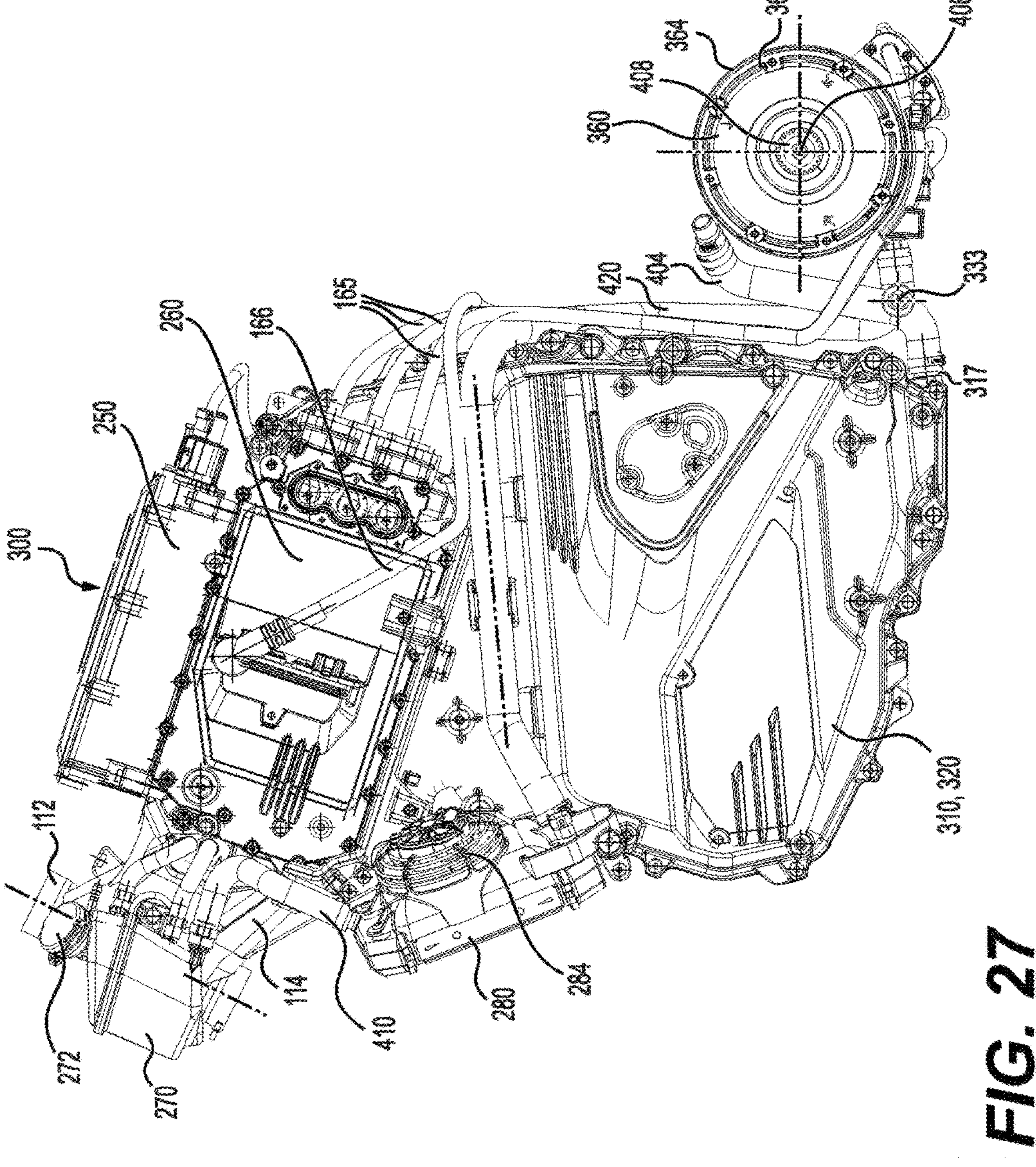
FIG. 27 is a left side elevation view of the components of FIG. 25 with the swing arm being omitted.

Power is provided to the motor 360 by an electronic powerpack 300, which replaces the powerpack 200 in this embodiment. The powerpack 300 includes a battery pack 310. The battery pack 310 includes a battery housing 320. The battery housing 320 is fastened to the frame members 318. As best seen in FIGS. 25 and 27, in the present embodiment, the battery pack 310 is completely forward of the swing arm pivot axis 333. The battery pack 310 includes a plurality of battery cells (not shown) housed in the battery housing 320. Depending on the particular implementational details of a given embodiment of the vehicle 100, the specific implementation details of the battery pack 310 and/or the plurality of battery cells could vary. For example, battery cells could vary in nominal energy capacity, usable energy capacity, discharge rate, cell chemistry and cell type. The powerpack 300 also includes a charger 250 and an inverter connected to the battery pack 310 as in the powerpack 200. The inverter 260 which is connected to the powerpack 300, is electrically connected to the three-phase motor 360 via three power cables 165 to supply power from the inverter 260 to the electric motor 360. As can be seen in FIGS. 20, 25 and 26, a control cable 166 is electrically connected between the inverter 260 and the electric motor 360 to transmit control signals from the inverter 260 to the electric motor 360. The number of cables or type of electrical connection between the inverter 260 and the motor 360 could vary in different embodiments.

According to non-limiting embodiments of the present technology, the present embodiment also has a cooling circuit in the form of a closed fluid cooling loop for absorbing heat from the motor 360 and components of the powerpack 300. Heat transfer in the cooling circuit is provided by a liquid coolant, generally a glycol-water coolant, although it is contemplated that different liquid coolants could be utilized. It is noted that while liquid coolant is provided, some gases may also be present in the cooling circuit, due to phase transitions or air infiltrations.

As in the cooling circuit 290, the cooling circuit of the present embodiment has a coolant reservoir 270, a charger cooling channel defined in the charger 250, and an inverter cooling channel 264 defined in the inverter 260. The cooling circuit also has a battery cooling channel defined in the battery housing 320 that is similar to the battery cooling channel 226 described above. This battery cooling channel has a battery cooling channel outlet 317 (best seen in FIG. 27) that is located at the lower end of a rear side of the battery housing 320.

Figure 24:
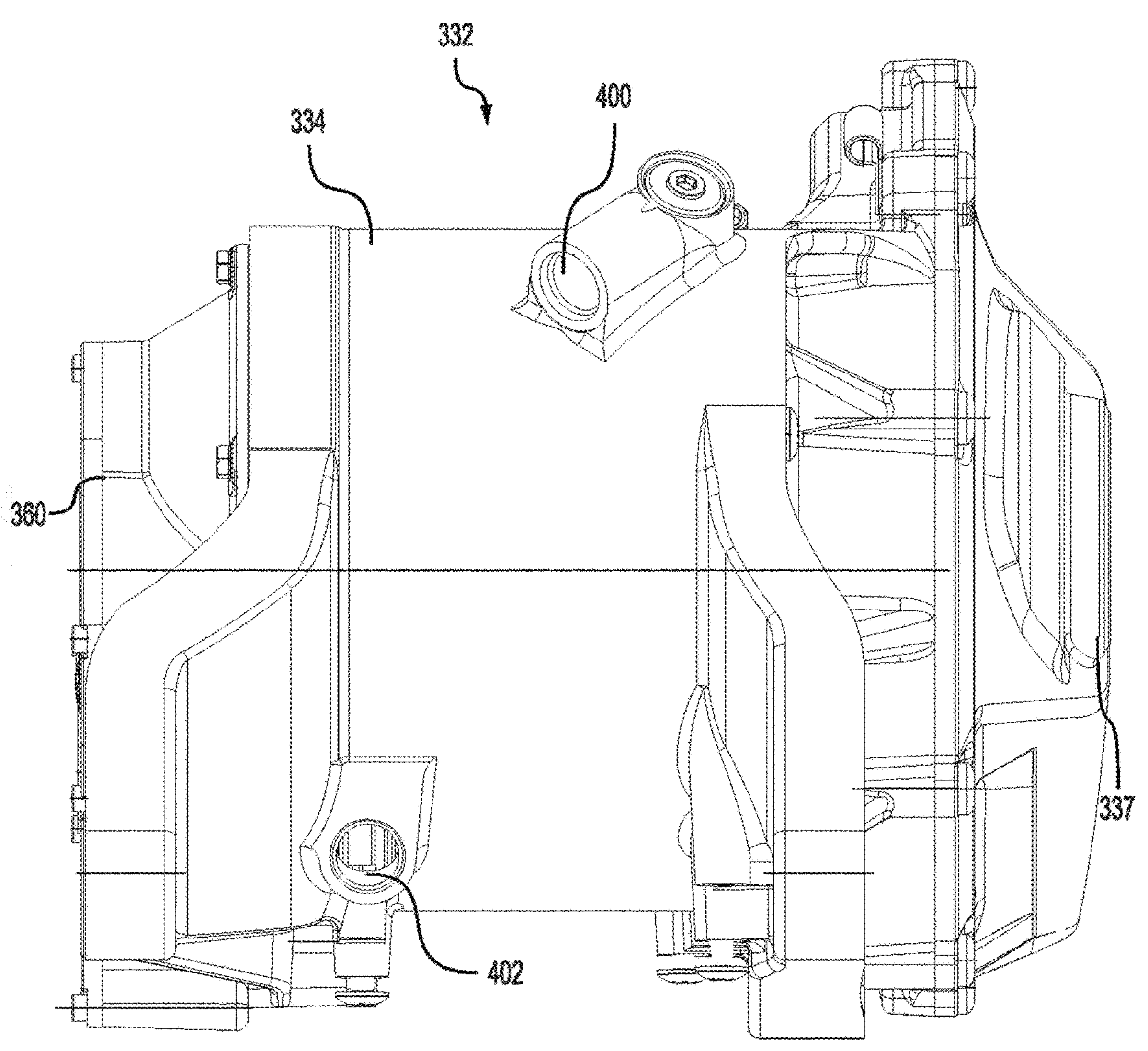
FIG. 24 is a front elevation view of an electric motor and the swing arm of FIG. 19.

With reference to FIG. 27, the electric motor 360 includes a motor housing 362. The motor housing 362 includes a channeled outer surface 364 in thermal contact with at least some internal components, including at least a stator and a rotor (not shown), of the motor 360. A motor cooling channel for cooling the electric motor 360 is formed between the channeled outer surface 364 and an internal surface of the motor cavity 335 in which the motor 360 is disposed. The motor cooling channel formed by the channeled outer surface 364 forms a spiral winding around an exterior of the electric motor 360. In some embodiments, the shape of the motor cooling channel could vary. As best seen in FIG. 24, the motor cooling channel has a motor cooling channel inlet 400 defined in a top portion of the portion of the swing arm housing 334 defining the motor housing 335, and a motor cooling channel outlet 402 defined in a bottom portion of the portion of the swing arm housing 334 defining the motor housing 335. The motor cooling channel inlet 400 is disposed on a left side of the swing arm housing 334 and the motor cooling channel outlet 402 is disposed on a right side of the swing arm housing 334.

Figure 23:
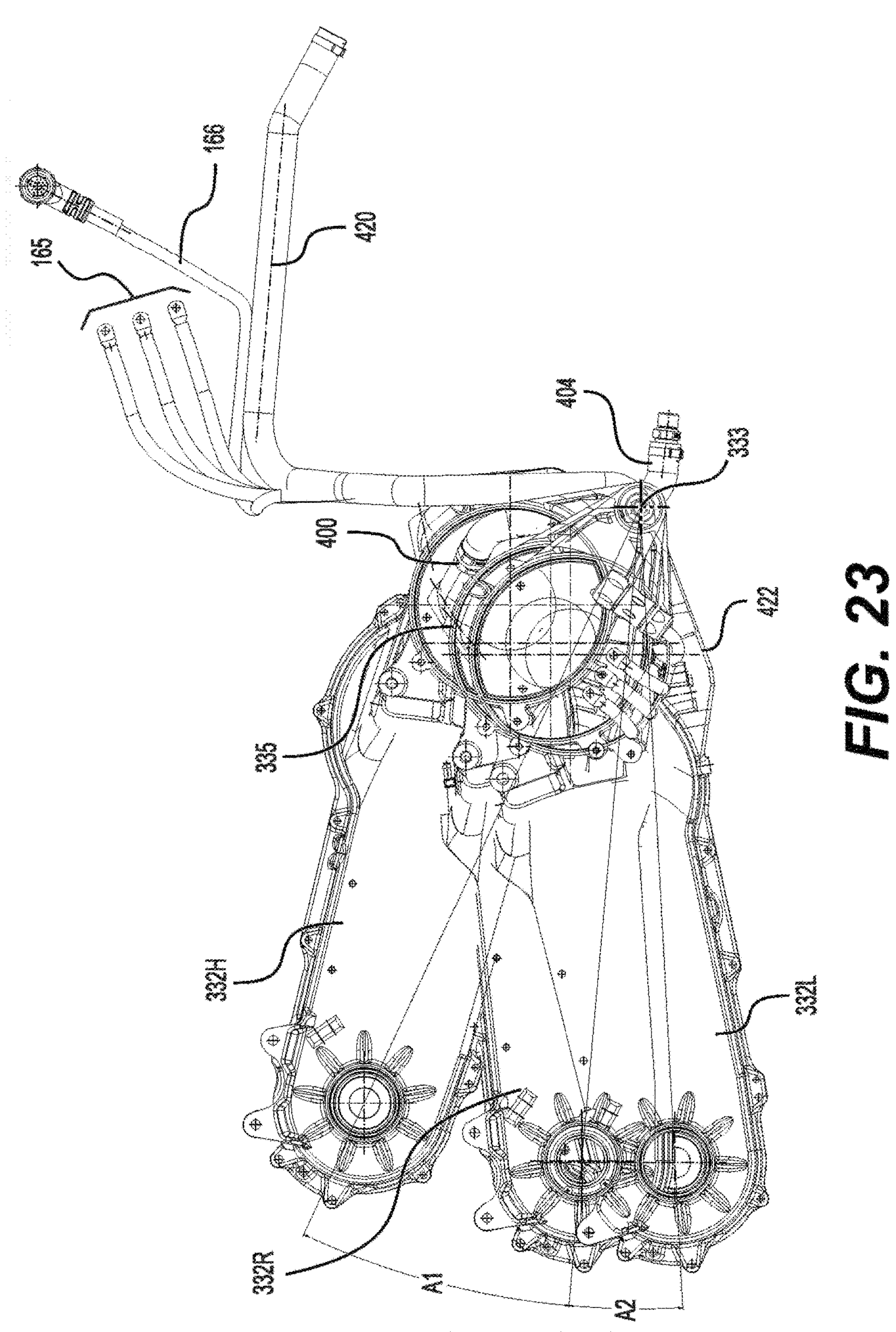
FIG. 23 is a right side elevation view of hoses, power cables, a control cable, and a swing arm of FIG. 19, with the swing arm shown in various positions.

The motor cooling channel inlet 400 is fluidly connected to the battery cooling channel outlet 317 by a flexible tube 404, also referred to as a hose 404. With reference to FIGS. 25 to 27, with the vehicle 100 at rest, a front end of the hose 404 is forward and vertically lower than the swing arm pivot axis 333 and a rear end of the hose 404 is rearward of the swing arm pivot axis 333 and vertically higher than the swing arm pivot axis 333. With the vehicle 100 at rest, the front end of the hose 404 is forward and vertically lower than an output shaft axis 406 of an output shaft 408 of the motor 360 and a rear end of the hose 404 is forward of the output shaft axis 406 and vertically higher than the output shaft axis 406. The shock absorber pivot axis 138 is rearward of the rear end of the hose 404. The hose 404 extends in a space defined laterally between the frame members 318 and longitudinally between the battery pack 310 and the motor 360. The swing arm pivot axis 333 extends through this space. As the motor 360 moves with the swing arm 332 relative to the frame, and thus the powerpack 300, flexible connections are needed to maintain fluid connection between portions of the cooling circuit in the powerpack 200 and portions of the cooling circuit in thermal communication with the motor 360. With reference to FIG. 23, the swing arm 332 is pivotable between an at rest (or neutral) position 332R, which is the position of the swing arm 332 when the vehicle 100 is at rest, a highest position 332H (a.k.a. full bump), and a lowest position 332L (a.k.a full droop). In the present embodiment, an angle A1 between the positions 332R and 332H is in the range of 17.5 to 22.5 degrees, and an angle A2 between the positions 332R and 332L is in the range of 7.5 to 12.5 degrees. In order to help reduce the movement of the hose 404 as the motor 360 moves with the swing arm 332 relative to the frame, the hose 404 is positioned such that the swing arm pivot axis 333 extends through the hose 404.

Figure 21:
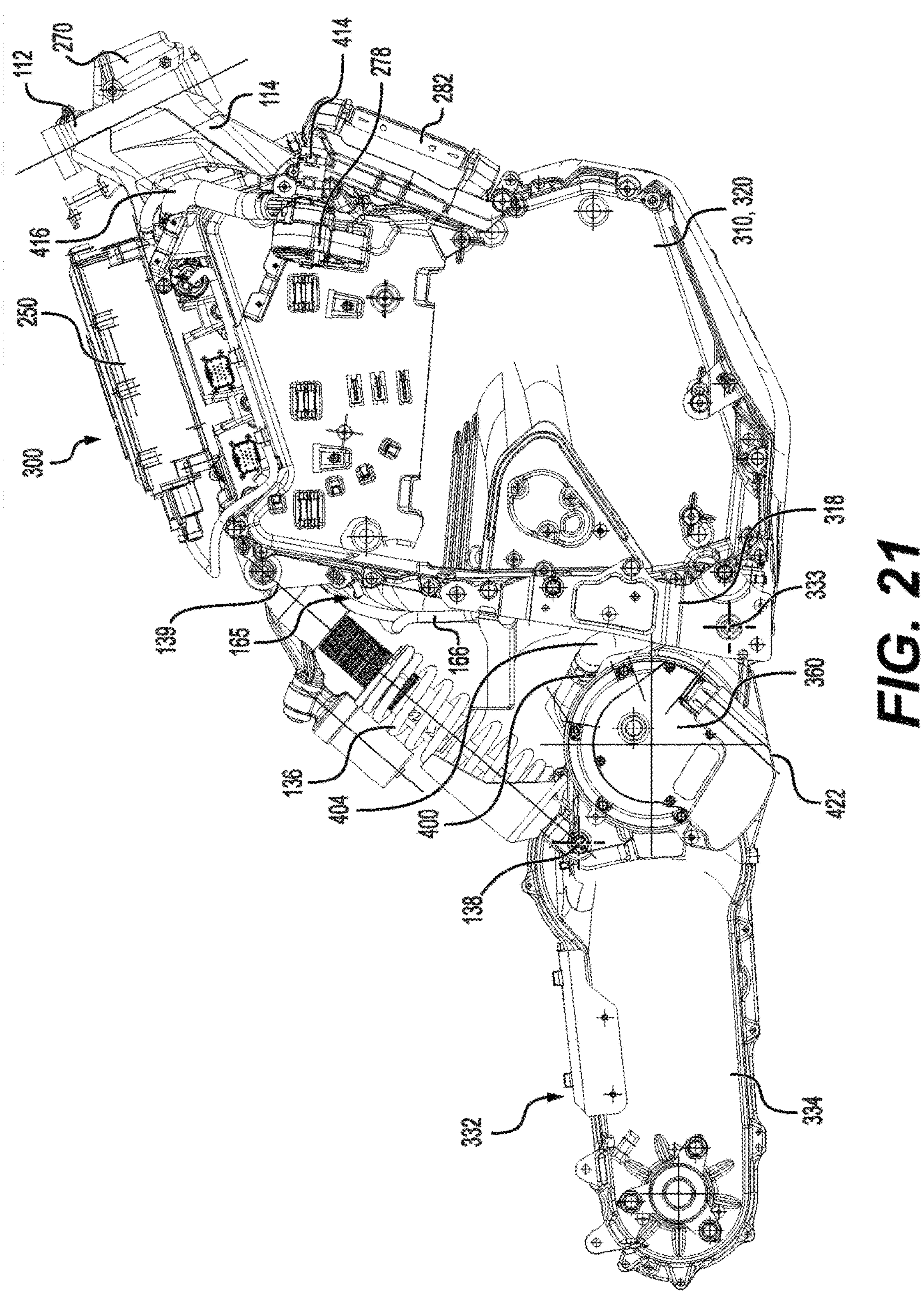
FIG. 21 is a right side elevation view of the components of FIG. 19.
Figure 22:
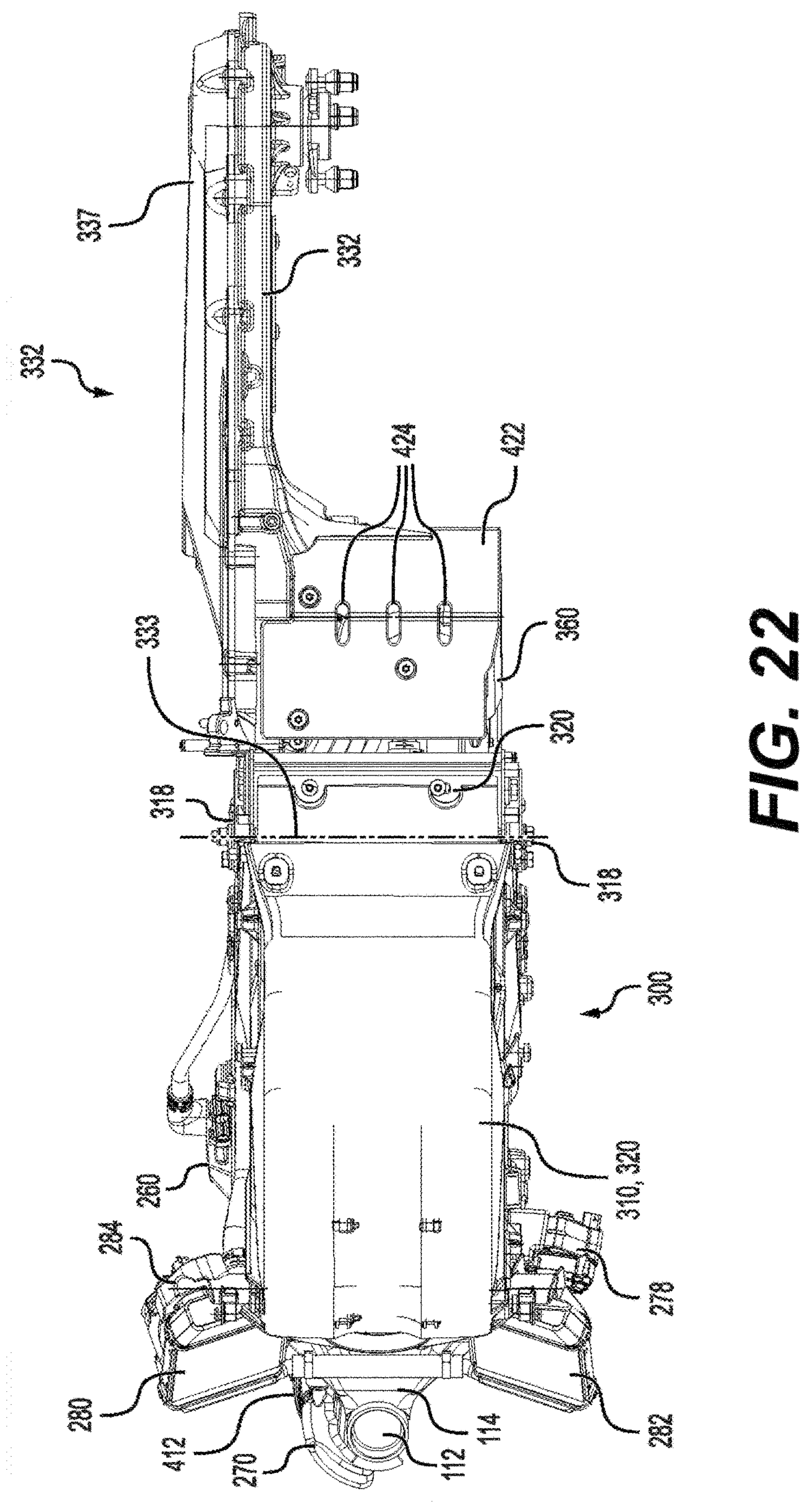
FIG. 22 is a bottom plan view of the components of FIG. 19.

With reference to FIGS. 20 to 22, as in the cooling circuit 290, the cooling circuit of the present embodiment has a coolant pump 278, a left radiator 280 and a right radiator 282, but these components are fluidly connected differently than in the cooling circuit 290. In this embodiment, the left radiator 280 is provided with the fan 284. The coolant reservoir 270 is fluidly connected to the left radiator 280 by a hose 410. A hose 412 fluidly connects the left radiator 280 to the right radiator 282. A hose 414 fluidly connects the right radiator 282 to the coolant pump 278 that is disposed rearward of the right radiator 282. A hose 416 fluidly connects the coolant pump 278 to the charger cooling channel of the charger 250.

The motor cooling channel outlet 402 is fluidly connected to the left radiator 280 by a flexible tube 420, also referred to as a hose 420. From the left radiator 280, the hose 420 extends along a left side of the battery housing 320, then down a rear side of the battery housing 320, extends in the space defined laterally between the frame members 318 and longitudinally between the battery pack 310 and the motor 360, and rearward to the motor cooling channel outlet 402. With reference to FIGS. 25 to 27, with the vehicle 100 at rest, a front end of the hose 420 is forward and vertically higher than the swing arm pivot axis 333 and a rear end of the hose 420 is rearward of the swing arm pivot axis 333 and partially vertically lower than the swing arm pivot axis 333. With the vehicle 100 at rest, the front end of the hose 420 is forward and vertically higher than the output shaft axis 406 and a rear end of the hose 420 is forward of the output shaft axis 406 and vertically lower than the output shaft axis 406. The shock absorber pivot axis 138 is rearward of the rear end of the hose 420. In order to help reduce the movement of the hose 420 as the motor 360 moves with the swing arm 332 relative to the frame, the hose 420 is positioned such that the swing arm pivot axis 333 extends through the hose 420.

A flow of coolant in the cooling circuit of the present embodiment will now be described. Beginning at the coolant pump 278 (for simplicity of description), coolant flows from the cooling pump 278 into the charger cooling channel of the charger 250 via the hose 416. Coolant then flows into the inverter cooling channel of the inverter 260 and then subsequently into the battery cooling channel of the battery pack 310. From the battery cooling channel, coolant flows to the motor cooling channel via the hose 404. Coolant then flows from the motor cooling channel to the left radiator 280 via the hose 420. Coolant then flows from the left radiator 280 to the right radiator 280 via the hose 412. Coolant is then returned to the coolant pump 278 from the right radiator 280 via the hose 414.

It is contemplated that the direction of coolant flow could be reversed in at least some embodiments. The order of some components forming the cooling circuit of the present embodiment could be changed in some alternative embodiments.

Like the hoses 404, 420 that have their rear ends connected to the swing arm 332 that moves relative to the powerpack 300, the power cables 165 and the control cable 166 have their rear ends connected to the electric motor 360 which moves relative to the powerpack 300 with the swing arm. In order to help reduce the movement of the cables 165, 166 as the motor 360 moves with the swing arm 332, the cables 165, 166 extend in the space defined laterally between the frame members 318 and longitudinally between the battery pack 310 and the motor 360. More specifically, from the inverter 260, the cables 165, 166 extend along a left side of the battery housing 320, then down a rear side of the battery housing 320, extend in the space defined laterally between the frame members 318 and longitudinally between the battery pack 310 and the motor 360, and rearward to connect to the electric motor 360. With reference to FIGS. 23 and 25 to 27, with the vehicle 100 at rest, front ends of the cables 165, 166 are forward and vertically higher than the swing arm pivot axis 333, rear ends of the cables 165, 166 are rearward of the swing arm pivot axis 333 and portions of the cables 165, 166 are rearward and vertically lower than the swing arm pivot axis 333. With the vehicle 100 at rest, the front ends of the cables 165, 166 are forward and vertically higher than the output shaft axis 406 and rear ends of the cables 165, 166 are vertically lower than the output shaft axis 406. The shock absorber pivot axis 138 is rearward of the rear ends of the cables 165, 166. As best seen in FIG. 27, the portions of the cables 165, 166 that are longitudinally aligned with the swing arm pivot axis 333 are vertically higher than the swing arm pivot axis 333.

As can be seen in FIGS. 26 and 27, portions of the hose 420 and the cables 165, 166 extend under the portion of the swing arm housing 334 defining the motor housing 335. To protect these portions of the hose 420 and the cables 165, 166, as can be seen in FIG. 22, a cover 422 is connected to a bottom of the swing arm 332 such that these portions of the hose 420 and the cables 165, 166 are disposed between the cover 420 and the swing arm 332, and also between the cover 422 and the electric motor 360. The cover 422 has drain apertures 424 to prevent water from accumulating inside the cover 422.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. An electric vehicle comprising:

a frame, the frame having a pair of frame members;

a front ground-engaging member operatively connected to the frame;

a swing arm pivotally connected to the pair of frame members about a swing arm pivot axis, the swing arm pivot axis extending through the pair of frame members;

a rear ground-engaging member operatively connected to the swing arm;

an electric motor mounted to the swing arm and operatively connected to the rear ground-engaging member;

a motor cooling channel in thermal communication with the electric motor for cooling the electric motor;

a battery pack connected to the frame;

a battery cooling channel in thermal communication with the battery pack for cooling the battery pack;

at least one hose fluidly connected between the battery cooling channel and the motor cooling channel, the at least one hose extending in a space defined laterally between the frame members and longitudinally between the battery pack and the motor; and at least one power cable electrically connected between the battery pack and the motor, the at least one power cable extending in the space.

2. The vehicle of claim 1, wherein the swing arm pivot axis extends through the space defined laterally between the frame members and longitudinally between the battery pack and the motor.

3. The vehicle of claim 1, wherein:

the at least one hose includes a first hose; and with the vehicle at rest:

a front end of the first hose is forward of the swing arm pivot axis;

the front end of the first hose is vertically higher than the swing arm pivot axis;

a rear end of the first hose is rearward of the swing arm pivot axis; and the rear end of the first hose is at least in part vertically lower than the swing arm pivot axis.

4. The vehicle of claim 3, wherein:

the at least one hose includes a second hose; and with the vehicle at rest:

a front end of the second hose is forward of the swing arm pivot axis;

the front end of the second hose is at least in part vertically lower than the swing arm pivot axis;

a rear end of the second hose is rearward of the swing arm pivot axis; and the rear end of the second hose is vertically higher than the swing arm pivot axis.

5. The vehicle of claim 1, wherein:

the electric motor has an output shaft, the output shaft defines an output shaft axis; the at least one hose includes a first hose; and with the vehicle at rest:

a front end of the first hose is forward of the swing arm pivot axis;

the front end of the first hose is vertically higher than the output shaft axis;

a rear end of the first hose is rearward of the swing arm pivot axis; and the rear end of the first hose is vertically lower than the output shaft axis.

6. The vehicle of claim 1, wherein, with the vehicle at rest:

a front end of the at least one power cable is forward of the swing arm pivot axis;

the front end of the at least one power cable is vertically higher than the swing arm pivot axis;

a rear end of the at least one power cable is rearward of the swing arm pivot axis; and at least a portion of the at least one power cable being rearward and at least in part vertically lower than the swing arm pivot axis.

7. The vehicle of claim 1, wherein:

the electric motor has an output shaft, the output shaft defines an output shaft axis; and with the vehicle at rest:

a front end of the at least one power cable is forward of the swing arm pivot axis;

the front end of the at least one power cable is vertically higher than the output shaft axis;

a rear end of the at least one power cable is rearward of the swing arm pivot axis; and the rear end of the at least one power cable is vertically lower than the output shaft axis.

8. The vehicle of claim 1, wherein a portion of the at least one power cable being longitudinally aligned with the swing arm pivot axis is vertically higher than the swing arm pivot axis.

9. The vehicle of claim 1, further comprising an inverter electrically connected to the battery pack; and wherein the at least one power cable is electrically connected between the inverter and the electric motor.

10. The vehicle of claim 1, further comprising a cover connected to a bottom of the swing arm; and wherein portions of the at least one hose and the at least one power cable are disposed between the cover and the electric motor.

11. The vehicle of claim 1, wherein the battery pack includes:

a battery housing defining the battery cooling channel; and a plurality of battery cells housed in the battery housing.

12. The vehicle of claim 1, wherein the battery pack is completely forward of the swing arm pivot axis.

13. The vehicle of claim 1, further comprising a shock absorber operatively connected between the frame and the swing arm, the shock absorber being pivotally connected to the swing arm about a shock absorber pivot axis, the shock absorber pivot axis being rearward of rear ends of the at least one hose and the at least one power cable.

14. An electric vehicle comprising:

a frame, the frame having a pair of frame members;

a front ground-engaging member operatively connected to the frame;

a swing arm pivotally connected to the pair of frame members about a swing arm pivot axis, the swing arm pivot axis extending through the pair of frame members;

a rear ground-engaging member operatively connected to the swing arm;

an electric motor mounted to the swing arm and operatively connected to the rear ground-engaging member;

a motor cooling channel in thermal communication with the electric motor for cooling the electric motor;

a battery pack connected to the frame;

a battery cooling channel in thermal communication with the battery pack for cooling the battery pack; and at least one hose fluidly connected between the battery cooling channel and the motor cooling channel, the at least one hose extending in a space defined laterally between the frame members and longitudinally between the battery pack and the motor.

15. The vehicle of claim 14, wherein the swing arm pivot axis extends through the space defined laterally between the frame members and longitudinally between the battery pack and the motor.

16. The vehicle of claim 14, wherein, with the vehicle at rest:

a front end of the at least one hose is forward of the swing arm pivot axis;

the front end of the at least one hose is vertically higher than the swing arm pivot axis;

a rear end of the at least one hose is rearward of the swing arm pivot axis; and the rear end of the at least one hose is at least in part vertically lower than the swing arm pivot axis.

17. The vehicle of claim 14, wherein part of the at least one hose is disposed at a radial distance from the swing arm pivot axis that is less than twice a diameter of the at least one hose.

18. The vehicle of claim 14, wherein:

the at least one hose includes a first hose and a second hose;

coolant flowing from the battery cooling channel to the motor cooling channel via one of the first and second hoses; and coolant flowing from the motor cooling channel to the battery cooling channel via another one of the first and second hoses.

19. The vehicle of claim 14, wherein the battery pack includes:

a battery housing defining the battery cooling channel; and a plurality of battery cells housed in the battery housing.

20. The vehicle of claim 14, wherein the battery pack is completely forward of the swing arm pivot axis.

* * * * *